United States Patent
Gotoh et al.

(10) Patent No.: US 7,616,634 B2
(45) Date of Patent: Nov. 10, 2009

(54) GATEWAY DEVICE CONNECTING MULTICAST-SUPPORTED NETWORK TO MULTICAST-UNSUPPORTED L2 NETWORK

(75) Inventors: Tomonori Gotoh, Kawasaki (JP); Kenzo Kobayashi, Kawasaki (JP); Yasutaka Umemoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 11/181,776

(22) Filed: Jul. 15, 2005

(65) Prior Publication Data
US 2006/0198394 A1    Sep. 7, 2006

(30) Foreign Application Priority Data
Mar. 1, 2005    (JP)    ............................. 2005-055318

(51) Int. Cl.
*H04L 12/56*    (2006.01)
(52) U.S. Cl. .................... 370/390; 370/392; 370/401
(58) Field of Classification Search .................. None
See application file for complete search history.

(56) References Cited

U.S. PATENT DOCUMENTS

| | | | | |
|---|---|---|---|---|
| 6,873,627 | B1 * | 3/2005 | Miller et al. | 370/466 |
| 2004/0213272 | A1 * | 10/2004 | Nishi et al. | 370/401 |
| 2004/0252717 | A1 * | 12/2004 | Solomon et al. | 370/466 |
| 2005/0138369 | A1 * | 6/2005 | Lebovitz et al. | 713/163 |

* cited by examiner

*Primary Examiner*—Daniel J. Ryman
*Assistant Examiner*—Tito Pham
(74) *Attorney, Agent, or Firm*—Staas & Halsey LLP

(57) ABSTRACT

Disclosed is a network system capable of transferring data at a high speed between multicast-supported networks via a L2 network. The network system includes a multicast-unsupported L2 network, two multicast-supported network, two gateway devices for connecting one of the multicast-supported networks to the multicast-unsupported L2 network, and each of witch is capble of assembling, when a multicast data packet is transmitted from the side of the multicast-supported network, a L2-network packet in which a destination MAC address of the multicast data packet is translated into a MAC address of the other gateway device, and transmitting the L2-network packet over the L2 network.

7 Claims, 19 Drawing Sheets

FIG. 4

| IF | ACCEPT MC ADDRESS | REQUEST DEST. IF | REQUEST DEST. ADDRESS | TRANSLATION MC ADDRESS |
|---|---|---|---|---|
| IF-1 | 230.0.0.1 | IF-2 | 192.168.0.1 | 230.0.0.1 |
| IF-2 | 231.1.1.1 | IF-1 | 10.0.0.1 | 230.1.1.1 |

TRANSLATION INFORMATION

| IF | IP ADDRESS | MAC ADDRESS |
|---|---|---|
| IF-2 | 192.168.0.1 | xx:xx:xx:xx:xx:xx |
| IF-1 | 10.0.0.1 | yy:yy:yy:yy:yy:yy |

| IF | MC ADDRESS | REQUEST SOURCE INFORMATION | REQUEST TIME | TRANSFER TYPE FLAG |
|---|---|---|---|---|
| IF-1 | 230.0.0.1 | 192.168.0.1 | T1 | UC |
| IF-2 | 231.1.1.1 | 10.0.0.1 | T2 | UC |

| IF | ACCEPT MC ADDRESS | REQUEST DEST. IF | REQUEST DEST. ADDRESS | TRANSLATION MC ADDRESS |
|---|---|---|---|---|
| IF-1 | MC-B | IF-2 | IP-B | MC-B |
| IF-1 | MC-C | IF-2 | IP-C | MC-C |
| IF-1 | MC-D | IF-2 | IP-D | MC-D |
| IF-2 | MC-A | IF-1 | IP-L3SW-A | MC-A |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-C | IF-2 | IP-C | MC-C |
| IF-1 | MC-D | IF-2 | IP-D | MC-D |
| IF-2 | MC-B | IF-1 | IP-L3SW-B | MC-B |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-B | IF-2 | IP-B | MC-B |
| IF-1 | MC-D | IF-2 | IP-D | MC-D |
| IF-2 | MC-C | IF-1 | IP-L3SW-C | MC-C |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-B | IF-2 | IP-B | MC-B |
| IF-1 | MC-C | IF-2 | IP-C | MC-C |
| IF-2 | MC-D | IF-1 | IP-L3SW-D | MC-D |

| IF | ACCEPT MC ADDRESS | REQUEST DEST. IF | REQUEST DEST. ADDRESS | TRANSLATION MC ADDRESS |
|---|---|---|---|---|
| IF-1 | MC-B | IF-2 | IP-B | MC-B |
| IF-1 | MC-C | IF-2 | IP-C | MC-C |
| IF-1 | MC-D | IF-2 | IP-D | MC-D |
| IF-2 | MC-A | IF-1 | IP-L3SW-A | MC-1 |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-C | IF-2 | IP-C | MC-C |
| IF-1 | MC-D | IF-2 | IP-D | MC-D |
| IF-2 | MC-B | IF-1 | IP-L3SW-B | MC-1 |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-B | IF-2 | IP-B | MC-B |
| IF-1 | MC-D | IF-2 | IP-D | MC-D |
| IF-2 | MC-C | IF-1 | IP-L3SW-C | MC-C |

| IF | ACCEPT MC ADDRESS | REQUEST DEST. IF | REQUEST DEST. ADDRESS | TRANSLATION MC ADDRESS |
|---|---|---|---|---|
| IF-1 | MC-A | IF-2 | IP-A | MC-A |
| IF-1 | MC-B | IF-2 | IP-B | MC-B |
| IF-1 | MC-C | IF-2 | IP-C | MC-C |
| IF-2 | MC-D | IF-1 | IP-L3SW-D | MC-D |

| IF | ACCEPT MC ADDRESS | REQUEST DEST. IF | REQUEST DEST. ADDRESS | TRANSLATION MC ADDRESS |
|---|---|---|---|---|
| IF-1 | MC-B' | IF-2 | IP-B | MC-B |
| IF-1 | MC-C | IF-2 | IP-C | MC-C |
| IF-1 | MC-D | IF-2 | IP-D | MC-D |
| IF-2 | MC-A | IF-1 | IP-L3SW-A | MC-A |

31A

FIG. 23
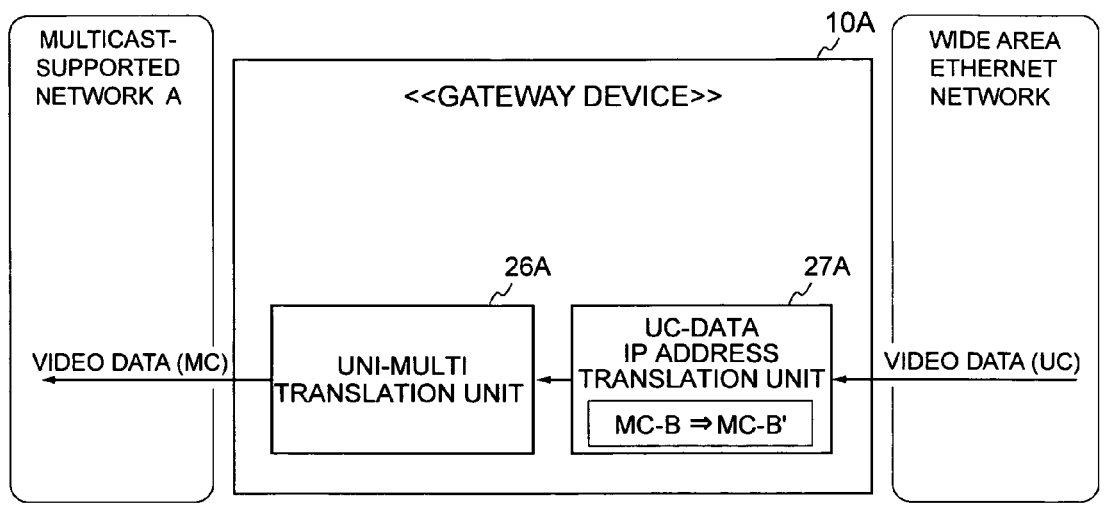
FIG. 24
| BIT RATE | TRANSFER TYPE CHANGE THRESHOLD VALUE |
|---|---|
| 0-1MBps | 16 |
| 1-2MBps | 8 |
| 2-6MBps | 2 |
FIG. 25
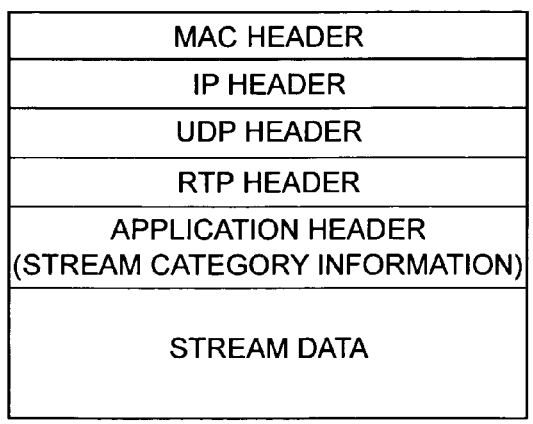

PRIOR ART

GATEWAY DEVICE CONNECTING MULTICAST-SUPPORTED NETWORK TO MULTICAST-UNSUPPORTED L2 NETWORK

BACKGROUND OF THE INVENTION

1. Field of the Invention

The present invention relates to a network system in which a plurality of multicast-supported networks are connected via gateway devices to a multicast-unsupported L2 (Layer 2) network, and to a gateway device for connecting the multicast-supported network to the multicast-unsupported L2 network.

2. Description of the Related Art

Over the recent years, a plurality of networks (such as networks extending in the same enterprise and over a plurality of offices of an organization) have been connected to each other via a multicast-unsupported L2 network such as a wide area Ethernet network. In the case of simply connecting the multicast-supported networks to each other via the wide area Ethernet network etc., however, it follows that a multicast packet is to be broadcast over the wide area Ethernet network. Then, if the multicast packet is broadcast over the wide area Ethernet network, there arise problems, wherein bands of the Ethernet network are used with futility, the multicast packet is transmitted also over a network having no necessity of transmission, and so on. Therefore, on the occasion of connecting the multicast-supported networks to each other via the wide area Ethernet network etc., as schematically shown in FIG. 26, there is provided a server that translates a packet format by temporarily deassembling the packet back into video data etc., and the multicast packet is translated by encapsulation into the unicast packet as schematically shown in FIG. 27.

Further, as schematically shown in FIG. 28, the multicast-supported networks are connected by preparing a dedicated line (and two relay devices) between every two networks that require relay of the multicast packet.

When the multicast-supported networks are connected in the configurations (topologies) as illustrated in FIGS. 26 through 28, it follows that there do not arise any problems derived from broadcasting the multicast packet over the wide area Ethernet network. In a system (FIG. 26) that terminates a multicast protocol by an application program, however, an extra period of time corresponding to the time needed for processing in each server is expended in transferring the video data etc.

Further, the packet transfer between the multicast-supported networks in the configuration as shown in FIG. 27 must involve preparing a device having a function of transmitting the packet in a way that segments the packet and a function of reassembling the packet transmitted in an as-segmented form. The reason is that a packet size after the encapsulation is not necessarily a transmission-enabled size over the wide area Ethernet network. Then, the device having these functions can not be manufactured at a low cost, and hence it takes a considerably high cost to transfer the packet between the multicast-supported networks in the configuration as shown in FIG. 27. Moreover, on the occasion of connecting the multicast-supported networks in the system (topology) shown in FIG. 28, there is also the necessity of preparing the dedicated line (and the two relay devices), and the considerably high cost is required.

SUMMARY OF THE INVENTION

It is an object of the present invention to provide a network system that is capable of transferring data at a high speed between multicast-supported networks having a configuration in which two or more multicast-supported networks are connected to each other via a L2 network and can be actualized (configured) at a low cost, and also a gateway device capable of configuring this network system.

To accomplish the above object, a gateway device according to a first mode of the present invention comprises data packet processing means for assembling, when a multicast data packet as a multicast packet of distribution target data is transmitted from the side of the multicast-supported network, a L2-network packet in which a destination MAC address of the multicast data packet is translated into a MAC address of a (another) gateway device connecting the multicast-unsupported L2 network to another multicast-supported network, and transmitting the L2-network packet over the L2 network, and L2-network packet processing means for assembling, when the L2-network packet is transmitted from the side of the L2 network, a packet in which a destination MAC address of the L2-network packet into a multicast MAC address associated with a multicast IP address set in the L2-network packet, and transmitting the thus-assembled packet over the multicast-supported network.

Namely, the gateway device according to the first mode of the present invention, if two pieces of the gateway devices of this type are employed, can actualize a system wherein the distribution target data (video data etc.) is transferred and received between the two multicast-supported networks, and can also actualize a system wherein each multicast data packet is, when transferring and receiving the distribution target data, transmitted as the unicast packet (the L2-network packet) over the L2 network. Then, the gateway device according to the first mode of the present invention performs the translation from the multicast packet into the unicast packet, and the translation from the unicast packet into the multicast packet by an extremely simple process such as changing the destination MAC address, and can be therefore manufactured at a low cost. Accordingly, the use of this gateway device makes it possible to actualize (configure) at a low cost the network system in which the data can be transferred at the high speed between the multicast-supported networks in the configuration that the two multicast-supported networks are connected to each other via the L2 network.

Moreover, the gateway device according to a second mode of the present invention comprises translation pattern information storage means capable of storing plural records of translation pattern information each consisting of an IP address and a MAC address, data request packet processing means for assembling, when a data request packet as a multicast packet for requesting distribution target data to be distributed is transmitted from the multicast-supported network, a second type data request packet in which a destination MAC address of the data request packet is translated into a MAC address of another gateway device capable of transmitting, over the L2 network, the multicast data packet related to the distribution target data of which the distribution is requested by the data request packet, and transmitting the second type data request packet over the L2 network, second type data request packet processing means for storing, when the second type data request packet is transmitted from the side of the L2 network, the translation pattern information storage means with the translation pattern information consisting of a multicast IP address set in the second type data request packet and the MAC address of the another gateway device transmitting the second type data request packet, assembling a packet in which the destination MAC address of the second type data request packet is translated into a multicast MAC address associated with the multicast IP address set in this second type data request packet, and transmitting this address-translated packet over the multicast-supported network, data packet processing means for assembling, when the multicast data packet as the multicast packet of the distribution target data is transmitted from the side of the multicast-supported network and if the translation pattern information storage means is stored with the translation pattern information containing an IP address coincident with the destination IP address of the multicast data packet, a L2-network packet in which the destination IP address of the multicast data packet is translated into the MAC address contained in the translation pattern information, and transmitting the L2-network packet over the L2 network, and L2-network packet processing means for assembling, when the L2-network packet is transmitted from the L2 network, a packet in which a destination MAC address of the L2-network packet into the multicast IP address set in the L2-network packet, and transmitting the address-translated packet over the multicast-supported network.

Namely, the gateway device according to the second mode of the present invention, if M-pieces of the gateway devices of this type are employed, can actualize a system wherein the distribution target data (video data etc.) is transferred and received between arbitrary two networks among M-pieces of multicast-supported networks, and can also actualize a system wherein each multicast data packet is, when transferring and receiving the distribution target data, transmitted as the unicast packet (the L2-network packet) over the L2 network. Then, the gateway device according to the second mode of the present invention performs, as by the gateway device according to the first mode of the present invention, the translation from the multicast packet into the unicast packet, and the translation from the unicast packet into the multicast packet by an extremely simple process such as changing the destination MAC address, and can be therefore manufactured at a low cost. Accordingly, the use of this gateway device makes it possible to actualize (configure) at a low cost the network system in which the data can be transferred at the high speed between the multicast-supported networks in the configuration that the plurality of (an arbitrary number of two or more) of two multicast-supported networks are connected to each other via the L2 network.

Note that on the occasion of actualizing the gateway device according to the second mode of the present invention, the data packet processing means can adopt means for assembling, if the translation pattern information storage means is stored with plural records of translation pattern information each containing the IP address coincident with the destination IP address of the multicast data packet, the L2-network packet with respect to every record of translation pattern information, and transmitting L2-network packet over the L2 network.

Moreover, the second type data request packet processing means can adopt means for changing, under such a condition that the translation pattern information storage means is stored with the translation pattern information containing the same IP address as the multicast IP address set in the second type data request packet and also containing a MAC address different from the MAC address of the gateway device transmitting the second type data request packet, the MAC address set in the translation pattern information into a broadcast MAC address.

Further, a network system of the present invention includes a multicast-unsupported L2 network, a first multicast-supported network, a second multicast-supported network, a first gateway device for connecting the first multicast-supported network to the multicast-unsupported L2 network, and a second gateway device for connecting the second multicast-supported network to the multicast-unsupported L2 network. Then, in the network system of the present invention, the first gateway device comprises data packet processing means for assembling, when a multicast data packet as a multicast packet of distribution target data is transmitted from the side of a first multicast-supported network, a L2-network packet in which a destination MAC address of the multicast data packet is translated into a MAC address of the second gateway device, and transmitting the L2-network packet over the L2 network. In this system, the second gateway device comprises L2-network packet processing means for assembling, when the L2-network packet is transmitted from the side of the multicast-unsupported L2 network, a packet in which a destination MAC address of the L2-network packet into a multicast MAC address associated with a multicast IP address set in the L2-network packet, and transmitting the thus-assembled packet over the second multicast-supported network.

Namely, in the network system of the present invention, the distribution target data (the video data etc.) can be transmitted from the side of the first multicast-supported network to the side of the second multicast-supported network, and each multicast data packet transmitted as the unicast packet (the L2-network packet) over the L2 network when transferring and receiving the distribution target data. Then, the first and second gateway devices employed in this network system perform the translation of the packet format (the translation from the multicast packet into the unicast packet, or the translation from the unicast packet into the multicast packet) by an extremely simple process such as changing the destination MAC address, and can be therefore manufactured at a low cost. Accordingly, this network system enables the high-speed data transfer between the multicast-supported networks in the configuration that the two multicast-supported networks are connected to each other via the L2 network, and can be actualized (configured) at a low cost.

BRIEF DESCRIPTION OF THE DRAWINGS

These and other objects and advantages of the present invention will become clear from the following description with reference to the accompanying drawings, wherein:

FIG. 4 is an explanatory diagram of a translation table provided in the gateway device;

FIG. 5 is an explanatory diagram of a MAC management table provided in the gateway device;

FIG. 6 is an explanatory diagram of a request management table provided in the gateway device;

FIGS. 15A-15D are explanatory diagrams of translation information registered in a translation table in each of four gate way devices;

FIGS. 20A-20D are explanatory diagrams of the translation information registered in the translation table in each of the four gate way devices;

FIG. 23 is an explanatory diagram showing a status of the gateway device;

FIG. 24 is a diagram showing a structure of a transfer type change threshold value table provided in the gateway device according to a second embodiment of the present invention;

FIG. 25 is an explanatory diagram of a video data packet;

DETAILED DESCRIPTION OF THE PREFERRED EMBODIMENTS

An in-depth description of a best mode for carrying out the present invention will hereinafter be given with reference to the drawings.

First Embodiment

Figure 1:
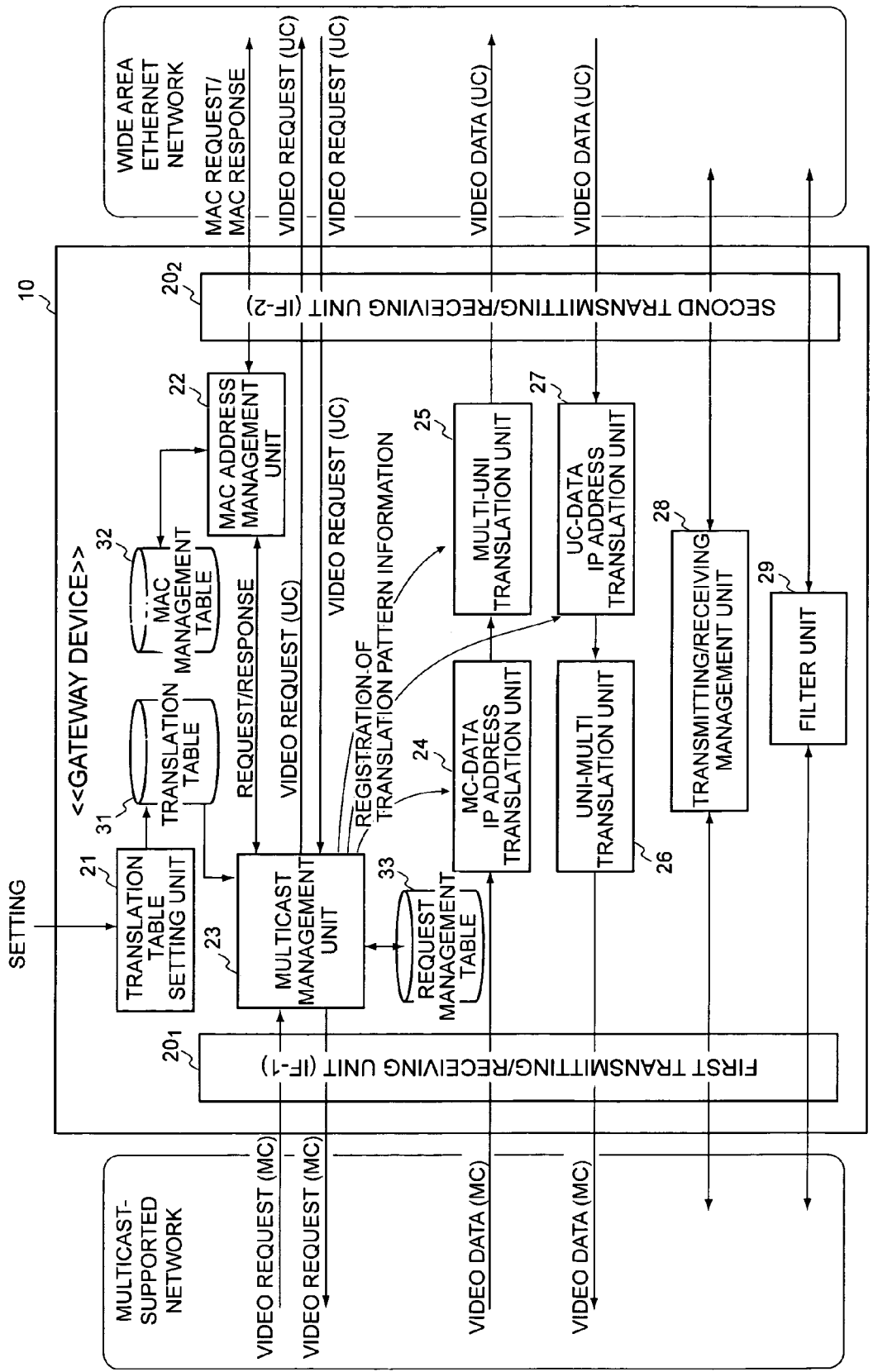
FIG. 1 is a view of a configuration of a gateway device according to a first embodiment of the present invention.

As shown in FIG. 1, a gateway device 10 according to a first embodiment of the present invention includes a first transmitting/receiving unit $20_1$ (which will hereinafter also simply be termed IF-1), a second transmitting/receiving unit 202 (which will hereinafter also simply be termed IF-2), a translation table setting unit 21, a MAC (Media Access Control) address management unit 22, a multicast management unit 23, an IP address translation unit 24 for MC (Multicast) data, a multi-uni translation unit 25, a uni-multi translation unit 26, an IP address translation unit 27 for the UC (UniCast) data, a transmitting/receiving management unit 28, a filter unit 29, a translation table 31, a MAC management table 32, a request management table 33, etc.

Figure 2:
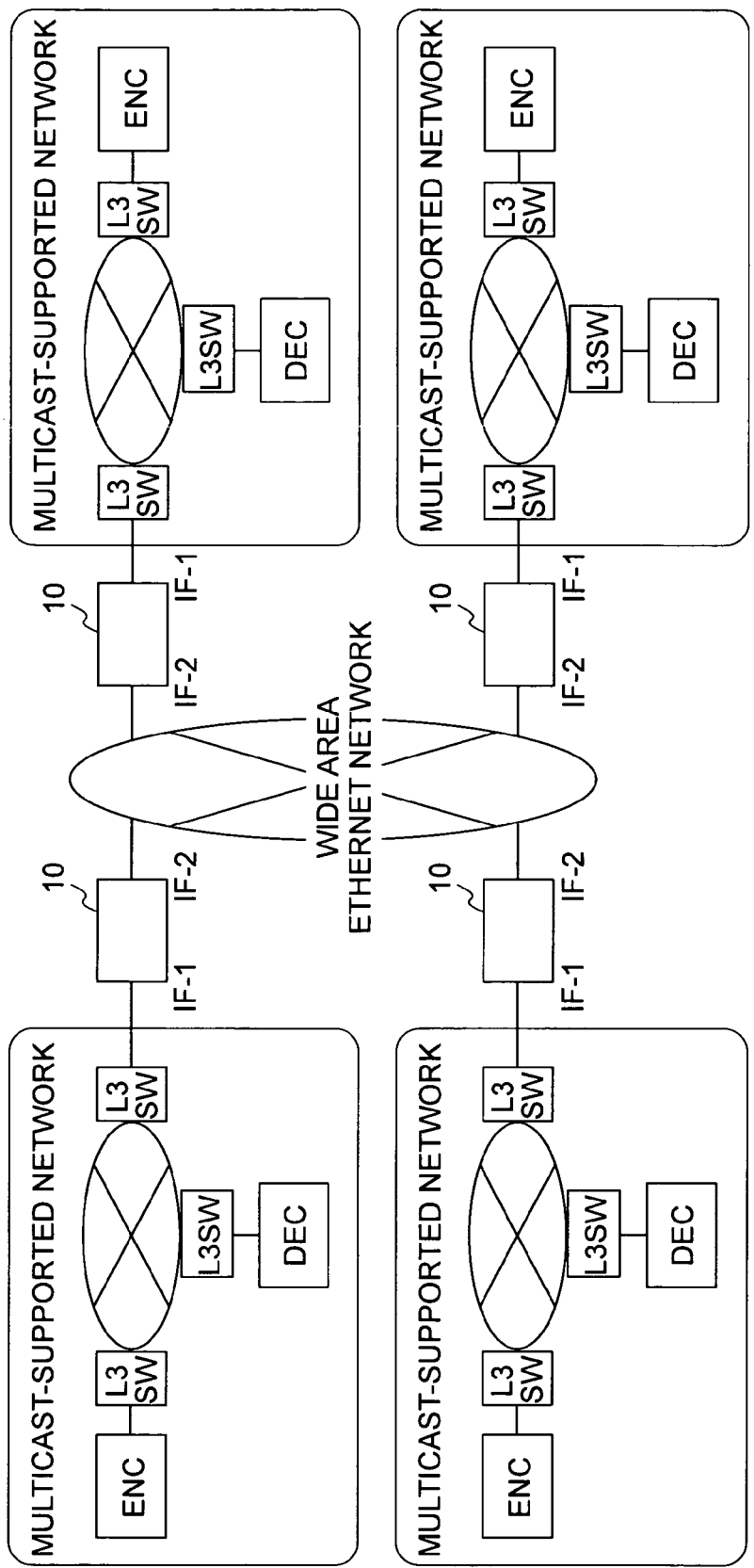
FIG. 2 is an explanatory view showing an application of the gateway device according to the first embodiment of the present invention.

The present gateway devices 10aredevices for configuring a network system as shown in FIG. 2, i.e., a network system in which a plurality of multicast-supported networks (where PIM-SM (Protocol Independent Multicast-Sparse Mode) functions in the first embodiment) are connected via the respective dedicated gateway devices 10 to a multicast-non-supported L2 network such as a wide area Ethernet network.

Before describing a function of the gateway device 10 (which is an operation of the network system employing the gateway devices 10) according to the first embodiment within the network system, functions of respective components provided in the gateway device 10 will be explained with reference to FIGS. 1 through 13. Note that a multicast address (a multicast IP address) will hereinafter also simply be referred to as a MC address in the following discussion.

The first transmitting/receiving unit $20_1$ (IF-1) and the second transmitting/receiving unit $20_2$ (IF-2) provided in the gateway device 10 are connected to a self-network (the multicast-supported network) and to the wide area Ethernet network, respectively (see FIGS. 1 and 2).

Figure 3:
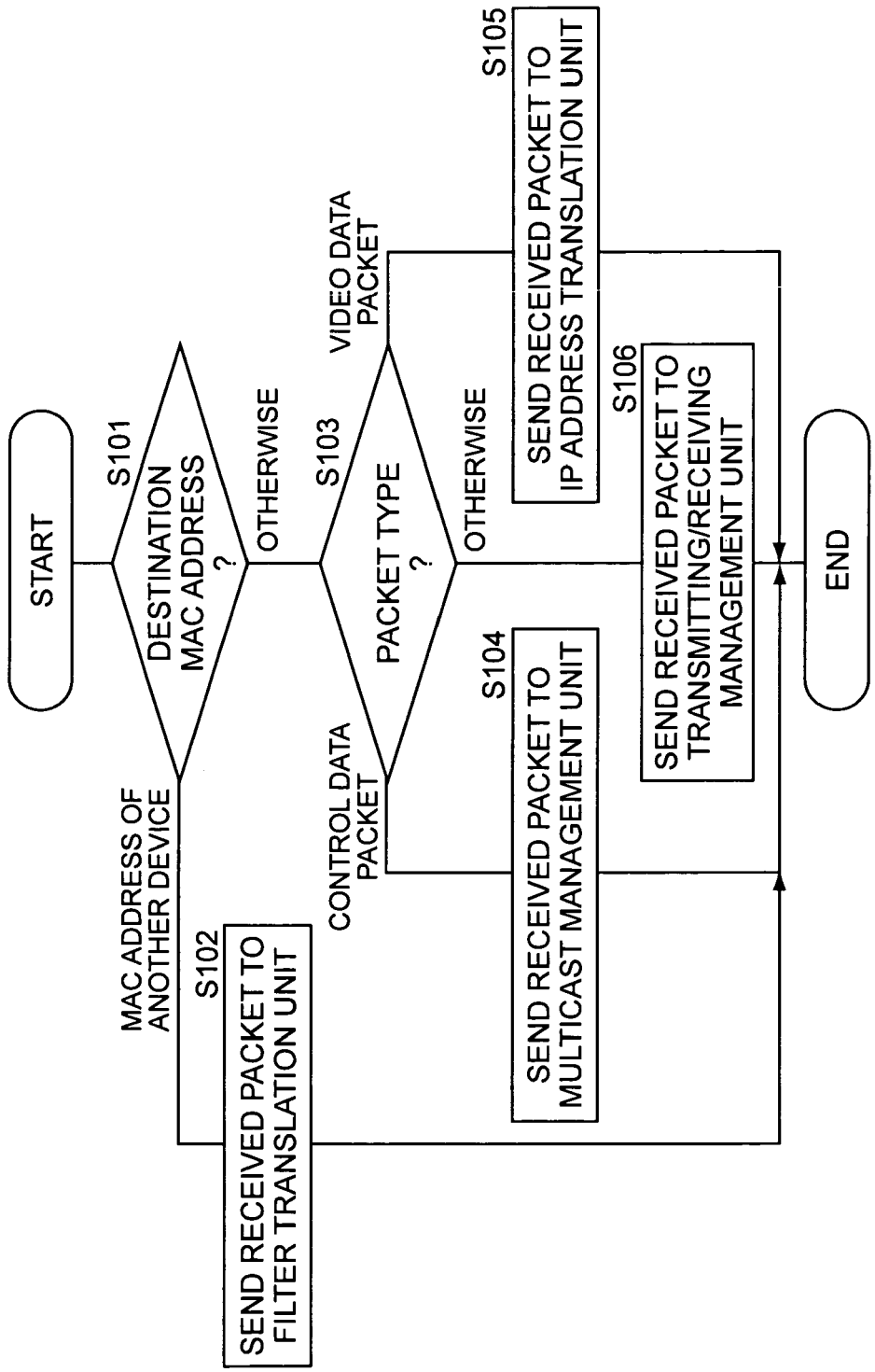
FIG. 3 is an explanatory flowchart showing an operation of each transmitting/receiving unit provided in the gateway device.

These transmitting/receiving units are constructed to process packets forwarded from the network sides in a procedure shown in FIG. 3.

To be specific, an N-th transmitting/receiving unit $20_N$ (N=1, 2), when a destination MAC address of the received packet is a MAC address of another device (step S101: another device MAC address) , sends this packet to the filter unit 29 (step S102). Note that the filter unit 29 (see FIG. 1) is a unit (a packet filtering unit) for assisting the gateway device 10 to function as a so-called firewall device.

While on the other hand, when the destination MAC address of the received packet is a MAC address of the self-unit, a multicast MAC address or a broadcast MAC address (step S101; others) ,the N-th transmitting/receiving, $20_N$ nudges a type of the received packet from the destination IP address etc. (step S103).

Then, the N-th transmitting/receiving unit $20_N$, when the received packet is classified as a multicast packet of control data (which will hereinafter be referred to as a control data packet) (step S103; control data packet) related to the multicast protocol, sends the received packet to the multicast management unit 23 (step S104). Further, the N-th transmitting/receiving unit $20_N$, when the received packet is classified as a multicast packet related to video data (which will hereinafter be called a video data packet) (step S103; video data packet) , sends the received packet to the IP address translation unit (the MC-data IP address translation unit 24 or the UC-data IP address IP address translation unit 27) connected to the self-unit (step S105). Further, the N-th transmitting/receiving unit $20_N$, if the received packet does not come under any types of data packets described above (step S103; others), sends the received packet to the transmitting/receiving management unit 28 defined as a unit for processing the variety of data addressed to the self-device (step S106).

Note that the control data packet and the video data packet received by the present gateway device 10 from the wide area Ethernet network are, though not described in detail, different from packets forwarded by other gateway devices 10 onto the wide area Ethernet network and transferred and received within the multicast-supported networks (which are the packets received by the gateway devices 10 from the self-networks)

The translation table 31 provided in the gateway device 10 has, as schematically shown in FIG. 4, a structure capable of storing plural records of translation information each consisting of an IF identifier (identifying information of the N-th transmitting/receiving unit $20_N$) , an accept MC address, a requested destination IF identifier), a requested destination address (which is a normal IP address) and a translation MC address.

An administrator registers the translation table 31 with the translation information, according to every video request (control data for requesting participation in a multicast group/ PIM-JOIN message) to be accepted by the gateway device 10, consisting of the information (the IF identifier and the accept MC address) for designating this video request, the information (the requested destination IF identifier and the requested destination address) for designating a video request transfer destination device (another gateway device 10 or L3SW (Layer-3 switch) connected to the IF-1), and the translation MC address (of which details will be explained later on) that is normally coincident with the accept MC address.

The translation table setting unit 21 (FIG. 1) is a unit (a so-called man/machine interface nit) employed for the administrator to register these records of translation information in the translation table 31.

A MAC management table 32 can be, as shown in FIG. 5, stored with plural records of MAC management information each consisting of an IF identifier, an IP address and a MAC address.

The MAC address management unit 22 (FIG. 1) is capable of executing a MAC management information registration request response process and a MAC address request response process.

The MAC management information registration request response process executed by the MAC address management unit 22 is a process of registering the MAC management table 32 with the MAC management information of which registration is requested by a MAC management information registration request (information/command, which contains the IF identifier, the IP address and the MAC address) issued by the multicast management unit 23.

The MAC address request response process is a process started by the MAC address management unit 22 when the multicast management unit 23 issues the MAC address request containing the IF identifier and the IP address.

The MAC management unit 22, which has started the MAC address request response process, at first, judges whether or not the MAC management table 32 is stored with the MAC management information containing the IF identifier and the IP address that are coincident with those in this MAC address request. Then, the MAC address management unit 22, if the MAC management information showing their coincidence is stored in the MAC management table 32, outputs the MAC address contained in the MAC management information concerned to the multicast management unit 23, thereby finishing the MAC address request response process.

Whereas if such a record of MAC management information is not stored in the MAC management table 32, the MAC address management unit 22 executes a process (based on ARP (Address Resolution Protocol)) of acquiring, from the wide area Ethernet network, a MAC address of the device having the IP address contained in the MAC address request. Then, the MAC address management unit 22, when the MAC address of the target device can be acquired, executes a process of registering the MAC management table 32 with the MAC management information containing the acquired MAC address etc. and a process of outputting this MAC address to the multicast management unit 23, and thereafter terminates the MAC address request response process. Further, the MAC address management unit 22, if unable to acquire the MAC address of the target device, executes a process of outputting MAC address non-existent notification data having a predetermined content to the multicast management unit 23, and thereafter finishes the MAC address request response process.

A request management table 33 can be, as shown in FIG. 6, stored with plural records of request management information each consisting of an IF identifier, a MC address, a requester information, request time and a transfer type flag. The request management table 33 (which will be described in depth later on) is used for the multicast management unit 23 to manage an operation status (an accept video request count and its content) of the gateway device 10.

Figure 7:
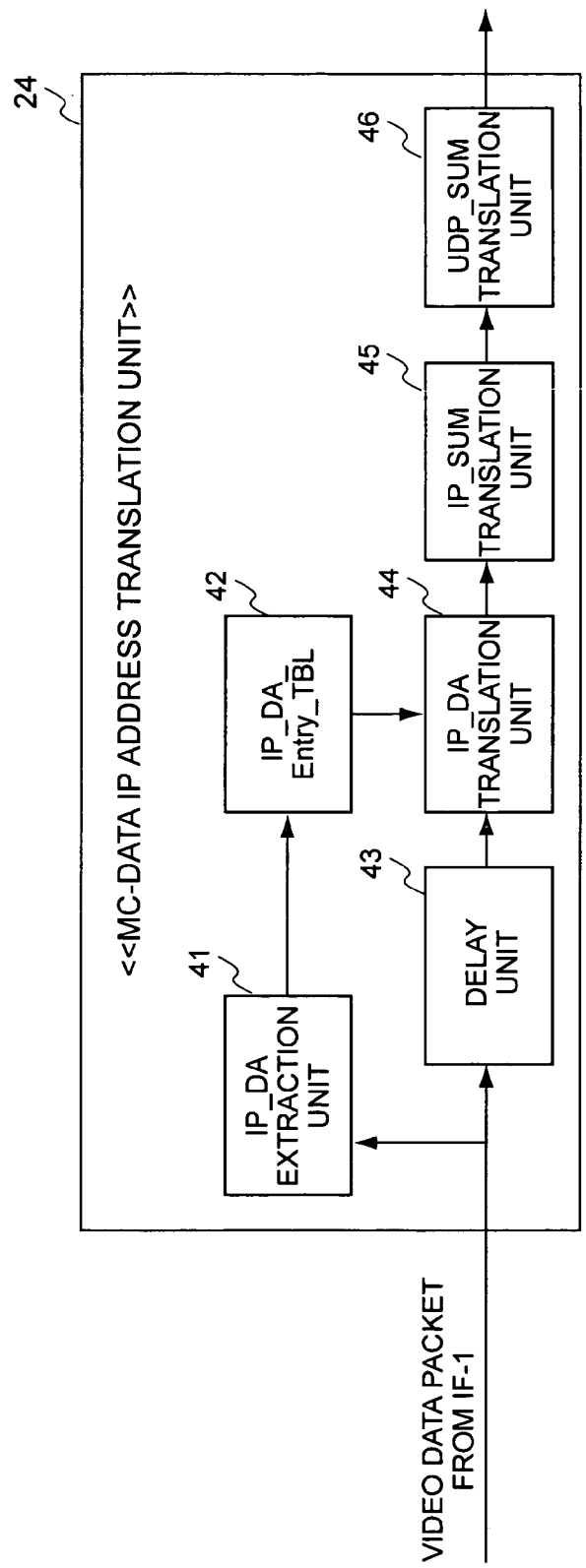
FIG. 7 is a diagram showing a configuration of a MC-data IP address translation unit provided in the gateway device.

The MC-data IP address translation unit 24 is a unit (a semiconductor integrated circuit) including, as shown in FIG. 7, an IP_DA extraction unit 41, an IP_DA_Entry_TBL 42, a DELAY unit 43, an IP_DA translation unit 44, an IP_SUM translation unit 45 and a UDP_SUM translation unit 46.

The IP_DA extraction unit 41 provided in the MC-data IP address translation unit 24 is a circuit for extracting the destination IP address from the video data packet (which will hereinafter be termed a processing target packet) inputted to the self-unit.

The IP_DA_Entry_TBL 42 is a circuit, wherein the multicast management unit 23 registers some pieces of translation pattern information each consisting of an input IP address and an output IP address. Then, the IP_DA_Entry_TBL 42 is also the circuit of, if registered with the translation pattern information containing the input IP address coincident with the destination IP address inputted from the IP_DA extraction unit 41, outputting the output IP address contained in the translation pattern information concerned, and, whereas if not registered with such a record of translation pattern information, outputting data (which will hereinafter be referred to as IP address non-existent notification data) having a predetermined content.

Note that the translation pattern information registered in the IP_DA_Entry_TBL 42 by the multicast management unit 23 is, though its detailed description will be given later on, the information in which both of the input IP address and the output IP address are multicast IP addresses. Further, the translation pattern information is the information in which the input IP address might be coincident with the output IP address.

The IP_DA translation unit 44 is a circuit of translating the destination IP address of the processing target packet into the IP address inputted from the IP_DA_Entry_TBL 42. The IP_DA translation unit 44 is also the circuit of discarding, if the data inputted from the IP_DA_Entry_TBL 42 is the aforementioned IP-address non-existent notification data, the processing target packet.

The DELAY unit 41 is a circuit of matching input timings of two categories of data (the processing target packet and the IP address) to the IP_DA translation unit 44. The IP_SUM translation unit 45 is a circuit of converting (recalculating) SUM in a L3 header (IP header) of the processing target packet. The UDP_SUM translation unit 46 is a circuit of converting SUM in a L4 header (UDP (User Datagram Protocol) header) of the processing target packet.

In short, the MC-data IP address translation unit 24 is capable of discarding each video data packet of which the associated translation pattern information is not registered, and translating (reassembling) each video data packet of which the associated translation pattern information is registered into a packet containing the setting of the destination IP address (the same location as the original exists) designated in the translation pattern information and thereafter sending the reassembled packet to the multi-uni translation unit 25.

Figure 8:
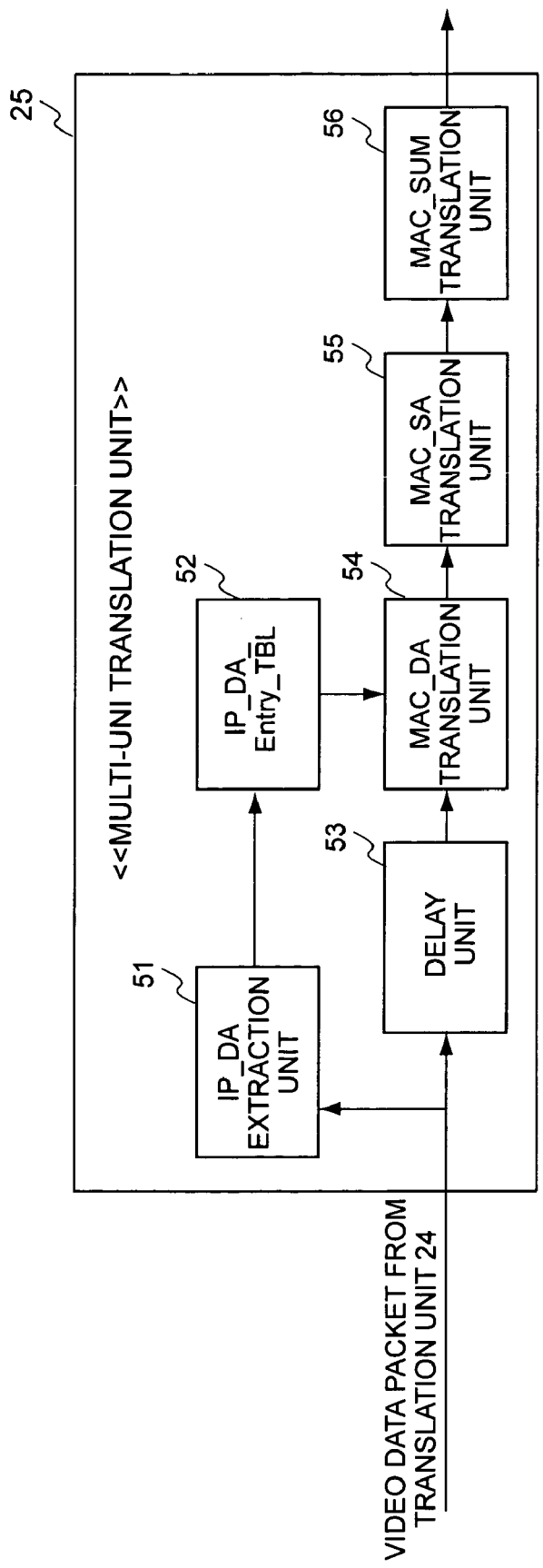
FIG. 8 is a diagram showing a configuration of a multi-uni translation unit provided in the gateway device.

The multi-uni translation unit 25 is a unit (a semiconductor integrated circuit) including, as shown in FIG. 8, an IP_DA extraction unit 51, an IP_DA_Entry TBL 52, a DELAY unit 53, a MAC_DA translation unit 54, a MAC_SA translation unit 55 and a MAC_SUM translation unit 56.

The IP_DA extraction unit 51 provided in the multi-uni translation unit 25 is a circuit for extracting the destination IP address from the video data packet (which will hereinafter be termed a processing target packet) inputted from the MC-data IP address translation unit 24.

The IP_DA_Entry_TBL 52 is a circuit, wherein the multicast management unit 23 registers some pieces of translation pattern information each consisting of an IP address (multicast IP address) and a MAC address (related to IF-2) or a broadcast MAC address of another gateway device 10. Then, the IP_DA_Entry TBL 52 is also the circuit of, if registered with the translation pattern information containing the same IP address as the destination address inputted from the IP_DA extraction unit 51, outputting the MAC address contained in the translation pattern information concerned, and, whereas if not registered with such a record of translation pattern information, outputting MAC address non-existent notification data having a predetermined content.

The MAC_DA translation unit 54 is a circuit of translating the destination MAC address of the processing target packet into the MAC address inputted from the IP_DA_Entry_TBL 52. The MAC_DA translation unit 54 is also the circuit of discarding, if the data inputted from the IP_DA_Entry_TBL 52 is the aforementioned IP address non-existent notification data, the processing target packet.

The MAC_SA translation unit 55 is a circuit of translating a source MAC address of the processing target packet into a MAC address of the IF-2. The MAC_SUM translation unit 56 is a circuit of converting (recalculating) SUM in a L2 header (MAC header) of the processing target packet.

In short, the multi-uni translation unit 25 can translate the video data packet (where a multicast MAC address is set as the destination MAC address) coming from the MC-data IP address translation unit 24 into a video data packet that is unicast over the wide area Ethernet network to another gateway device 10, or a video data packet that is broadcast over the wide area Ethernet network.

The UC-data IP address translation unit 27 (FIG. 1) is a unit (semiconductor integrated circuit) having the same configuration as the MC-data IP address translation unit 24 has (see FIG. 7). To be specific, the UC-data IP address translation unit 27 can discard each video data packet transmitted from the wide area Ethernet network and of which the associated translation pattern information is not registered, and can translate each video data packet transmitted from the wide area Ethernet network and of which the associated translation pattern information is registered into a packet containing the setting of the destination IP address (the same location as the original exists) designated in the translation pattern information concerned and thereafter send the translated packet to the uni-multi translation unit 26.

Figure 9:
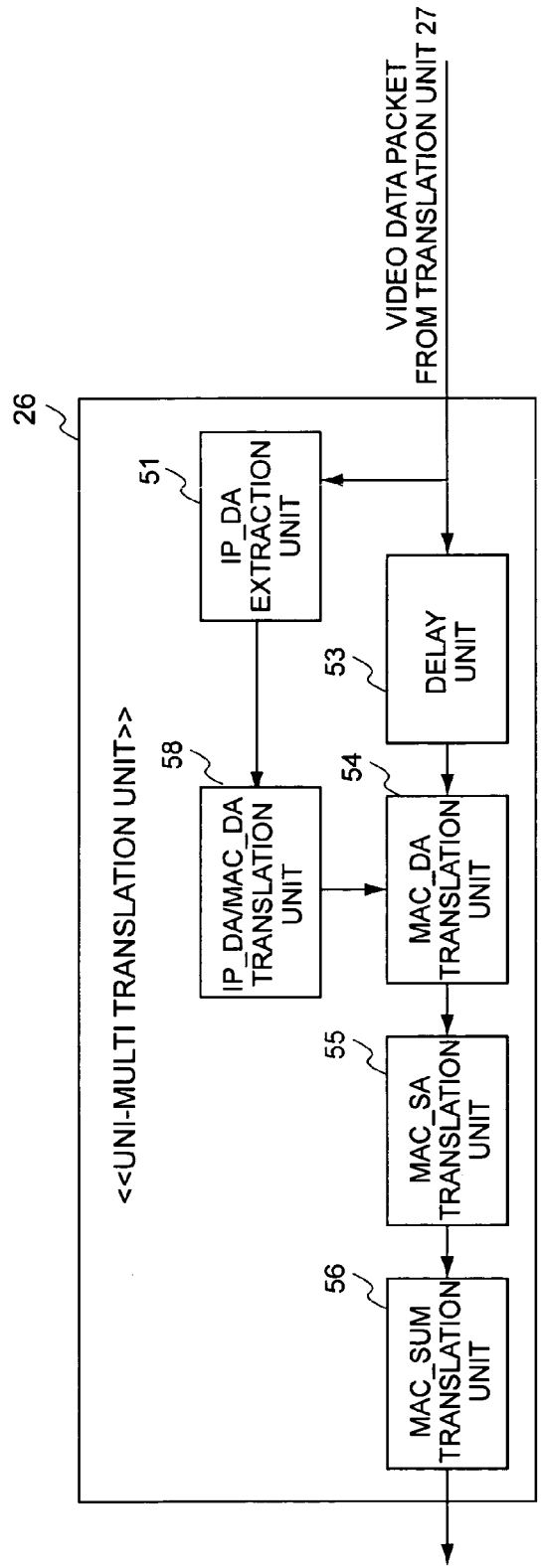
FIG. 9 is a diagram showing a configuration of a uni-multi translation unit provided in the gateway device.

The uni-multi translation unit 26 is a unit (semiconductor integrated circuit) including, as shown in FIG. 9, an IP_DA extraction unit 51, an IP_DA/MAC_DA translation unit 58, a DELAY unit 53, a MAC_DA translation unit 54, a MAC_SA translation unit 55 and a MAC_SUM translation unit 56.

Each of the IP_DA extraction unit 51, the DELAY unit 53, the MAC_DA translation unit 54, the MAC_SA translation unit 55 and the MAC_SUM translation unit 56 provided in the uni-multi translation unit 26 is the circuit having the same function of the circuit given the same name and the same numeral, which is provided in the multi-uni translation unit 25 (see FIG. 8) The IP_DA/MAC_DA translation unit 58 is a circuit (which outputs a MAC address in which high-order 25 bits take a predetermined value, and low-order 23 bits are coincident with low-order 23 bits of the IP address inputted from the IP_DA extraction unit 51) of outputting a multicast MAC address associated with the IP address (multicast IP address) inputted from the IP_DA extraction unit 51.

In short, the uni-multi translation unit 26 is capable of translating a video data packet (where a MAC address/broadcast MAC address of the IF-2 is set as the destination MAC address) coming from the UC-data IP address translation unit 27 into a normally-formatted multicast packet (where a multicast MAC address is set as the destination MAC address).

The multicast management unit 23 (FIG. 1) serves to, as obvious from the already-explained functions of the IF-1 and the IF-2, process the variety of control data packets. Though not described in detail, the variety of control data packets sent to the multicast management unit 23 from the IF-1 contain a control data packet making recognizable an IP address and a MAC address of the L3SW connected to the IF-1. The multicast management unit 23, when the control data packet is sent, issues a MAC management information registration request for registering the MAC management table 31 with the MAC management information consisting of the IP address etc. of the L3SW.

Figure 10:
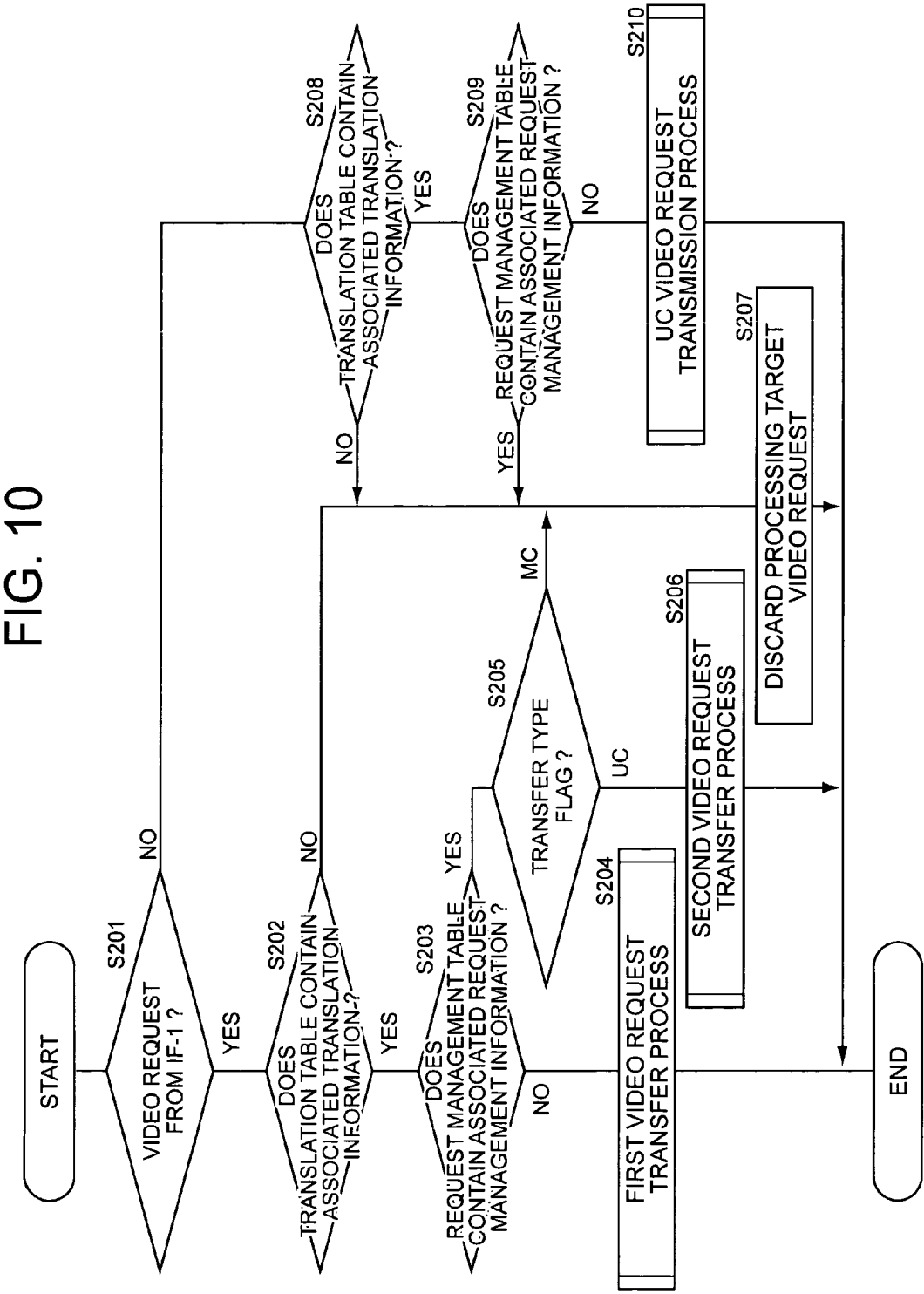
FIG. 10 is an explanatory flowchart showing an operation of a multicast management unit provided in the gateway device.

Further, the multicast management unit 23 executes processing in a procedure shown in FIG. 10 when a video request (which is a control data/PIM-JOIN message that requests for the participation in the multicast group).

Namely, the multicast management unit 23 given a certain video request, if this video request (which will hereinafter be referred to as a processing target video request) is sent from the IF-1 (step S201; NO), judges whether or not the translation table 31 (see FIG. 4) is stored with translation information (which will hereinafter be termed associated translation information) containing the IF identifier and the accept MC address that are coincident with an IF identifier of the IF sending the processing target video request and with a MC address set in the processing target video request (step S208).

Then, the multicast management unit 23, if the associated translation information is not stored in the translation table 31 (step S208; NO), discards the processing target video request (step S207), and thereafter terminates the process in FIG. 10.

The multicast management unit 23, whereas if the associated translation information is stored in the translation table 31 (step S208; YES) , judges whether or not associated request management information is stored in the request management table 33 (step S209). Note that the associated request management information connotes, as in the case of the associated translation information described above, the video request information containing the IF identifier and the accept MC address that are coincident with the IF identifier of the IF sending the processing target video request and with the MC address set in the processing target video request.

If the associated request management information is stored in the request management table 31 (step S209; YES), the multicast management unit 23 discards the processing target video request (step S207) and thereafter finishes the process in FIG. 10.

Whereas if the associated request management information is not stored in the request management table 31 (step S209; NO), the multicast management unit 23 executes a UN video request transmission process (step S210).

A content of this video request transmission process will be explained with reference to FIG. 11. Note that the accept MC address, the translation MC address and the requested destination address in the associated translation information (see FIG. 4) are respectively referred to as a processing target accept MC address, a processing target translation MC address and a processing target requested destination address in the following discussion.

Figure 11:
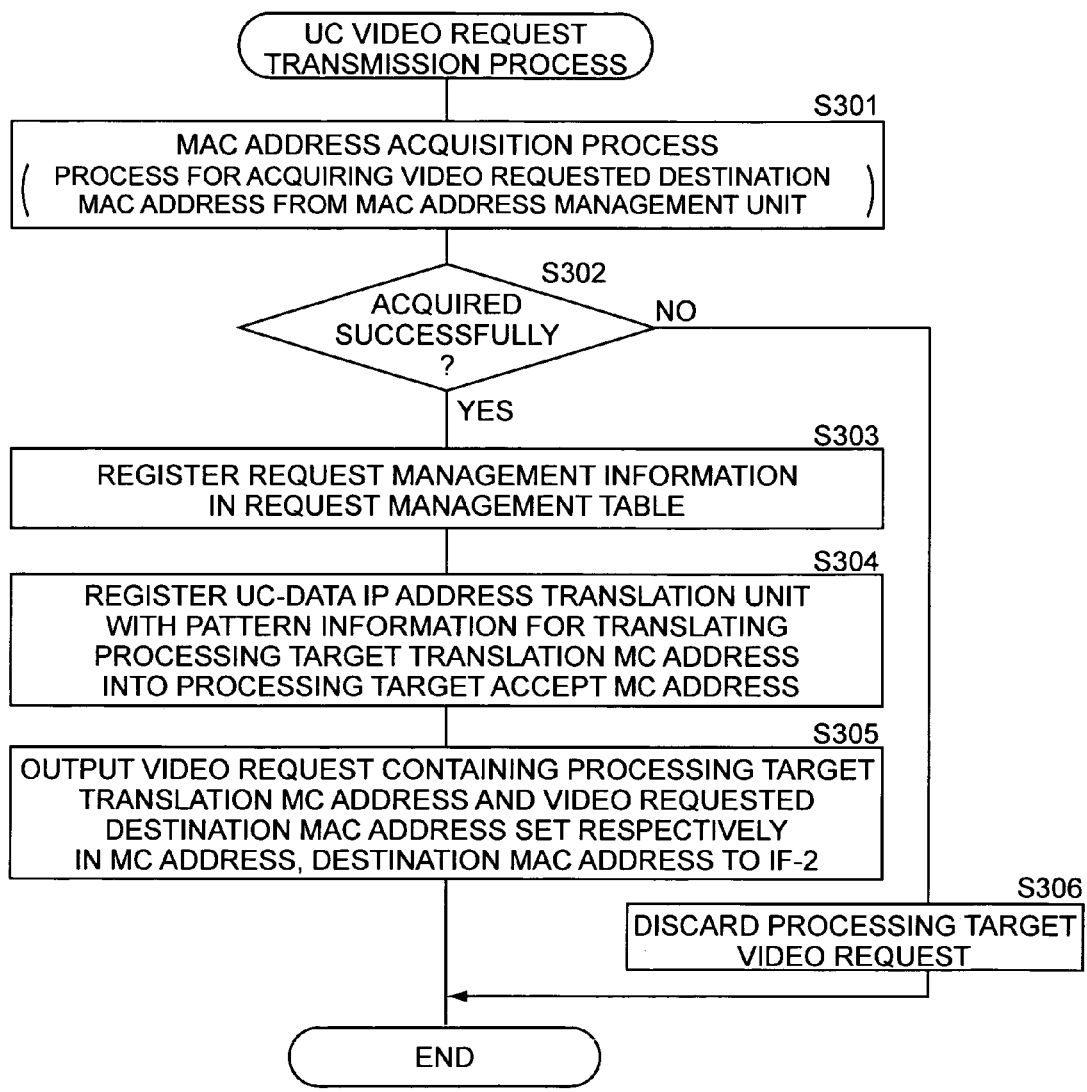
FIG. 11 is a flowchart showing a UC video request transmission process executed by the multicast management unit.

As shown in FIG. 11, the multicast management unit 23 starting the UC video request transmission process, to begin with, executes a MAC address acquisition process for acquiring from the MAC address management unit 22 a MAC address (which will hereinafter be termed a video requested destination MAC address) of a device (which is another gateway device 10 in this case) having the processing target requested destination address (step S301). Namely, the multicast management unit 23 executes, in this step S301, a process of issuing a MAC address request containing the processing target requested destination address etc. and waiting for inputting a response to this request from the MAC address management unit 22.

The multicast management unit 23 finishing the MAC address acquisition process, if unable to acquire the video requested destination MAC address from the MAC address management unit 22 (step S302; NO), discards the processing target video request (step S306), and thereafter terminates this UC video request transmission process and the process in FIG. 10.

While on the other hand, the multicast management unit 23, if able to acquire the video requested destination MAC address from the MAC address management unit 22 (step S302; YES), at first registers the request management table 33 (see FIG. 6) with the request management information in which "IF-1" is set as the IF identifier, the MC address contained in the processing target video request (=the processing target accept MC address) is set as the MC address, the IP address of the L3SW connected to the IF-1 (the processing target video request source IP address) is set as the request source information, the present time is set as the request time, and "UC" is set as the transfer type flag, respectively (step S303).

Subsequently, the multicast management unit 23 registers the UC-data IP address translation unit 27 with the translation pattern information for translating the processing target translation MC address (the translation MC address in the associated translation information) into the processing target accept MC address (the accept MC address in the associated translation information) (step S304).

Then, the multicast management unit 23 generates the video request having a content corresponding to the processing target video request and in which the processing target translation MC address is set as the MC address, and the video requested destination MAC address is set as the destination MAC address respectively, and outputs the thus-generated video request to the IF-2 (step S305). Thereafter, the multicast management unit 23 terminates this UC video request transmission process and the process in FIG. 10.

Further, the multicast management unit 23, if the processing target video request is a request sent from the IF-2 (FIG. 10: step S201; YES), judges whether or not the associated translation information is stored in the translation table 31 (step S202). Then, the multicast management unit 23, if the associated translation information is not stored in the translation table 31 (step S202; NO), discards the processing target video request (step S207), and thereafter terminates the process in FIG. 10.

Whereas if the associated translation information is stored in the translation table 31 (step S202; YES), the multicast management unit 23 judges whether or not the associated request management information is stored in the request management table 33 (step S203). Note that the associated request management information is, as already explained, the video request information containing the IF identifier and the accept MC address that are coincident with the IF identifier of the IF sending the processing target video request and with the MC address set in the processing target video request, respectively.

Then, the multicast management unit 23, if the associated request management information is not stored in the request management table 31 (step S203; NO), executes a first video request transfer process (step S204).

Figure 12:
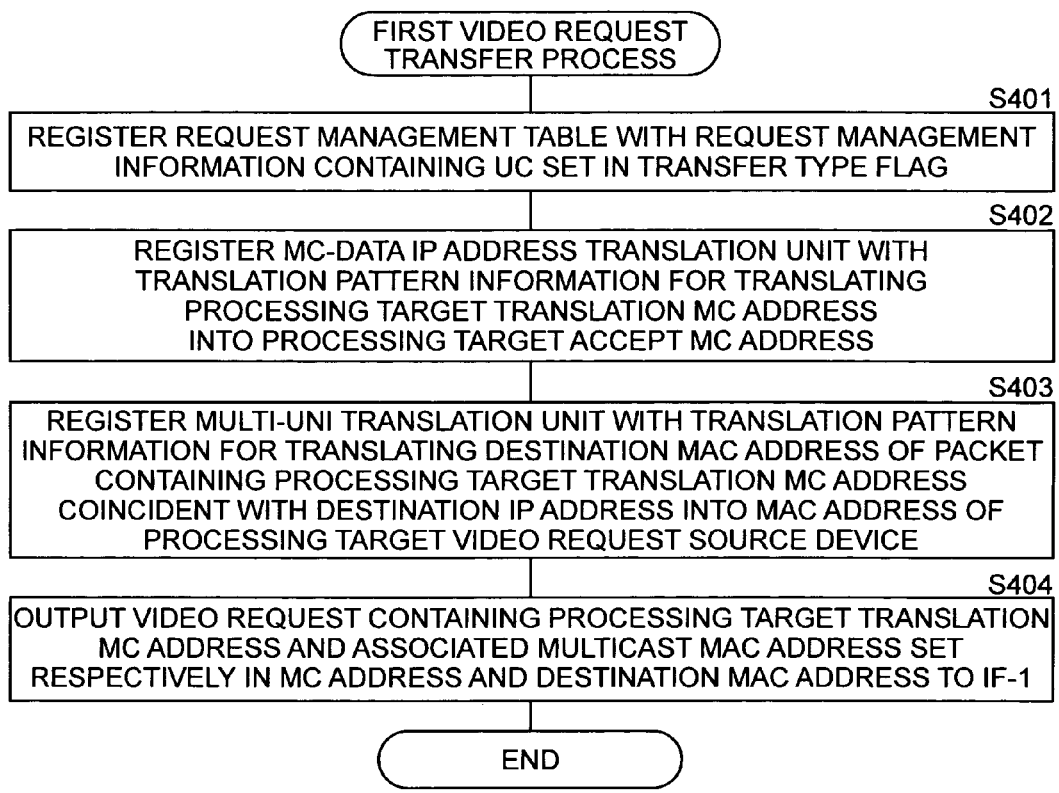
FIG. 12 is a flowchart showing a first video request transfer process executed by the multicast management unit.

In this step S204, the first video request transfer process executed by the multicast management unit 23 is a process in a procedure shown in FIG. 12.

More specifically, the multicast management unit 23 starting the first video request transfer process, at first, registers the request management 33 with the request management information wherein "IF-2" is set as the IF identifier, the MC address contained in the processing target video request is set as the MC address, the processing target request source IP address is set as the request source information, the present time is set as the request time, and "UC" is set as the transfer type flag, respectively (step S401).

Subsequently, the multicast management unit 23 executes a process of registering the MC-data IP address translation unit 24 with the translation pattern information for translating the processing target translation MC address (the translation MC address in the associated translation information) into the processing target accept MC address (the accept MC address in the associated translation information) (step S402). The multicast management unit 23 executes also a process of registering the multi-uni translation unit 25 with the translation pattern information for translating the destination MAC address of the packet of which the destination IP address is coincident with the processing target translation MC address, into a source MAC address of the processing target video request (step S403).

Then, the multicast management unit 23 generates the video request having a content corresponding to the processing target video request and in which the processing target translation MC address is set as the MC address, and the multicast MAC address associated with the processing target translation MC address is set as the destination MAC address respectively, and outputs the thus-generated video request to the IF-1 (step S404). Thereafter, the multicast management unit 23 terminates this first video request transfer process and the process in FIG. 10.

Further, the multicast management unit 23, if the associated request management information is stored in the request management table 33 (step S203; YES), judges which value, "UC" or "MC", is entered in the transfer type flag in the associated request management information (step S205).

If the "UC" is set in the transfer type flag in the associated request management information (step S205; UC), the multicast management unit 23 starts a second video request transfer process (step S206) in a procedure shown in FIG. 13.

To be specific, the multicast management unit 23 starting the second video request transfer process, to begin with, changes, to "MC", a value in the transfer type flag in the associated request management information, and adds an IP address of the processing target video request source device to the source information in the associated request management information (step S501).

Then, the multicast management unit 23 executes a process of registering the multi-uni translation unit 25 with the translation pattern information for translating, into a broadcast MAC address, the destination MAC address of the packet in which the destination IP address is coincident with the processing target translation MC address (step S502). The multicast management unit 23 executes also a process of generating the video request having a content corresponding to the processing target video request and in which the processing target translation MC address is set as the MC address, and the multicast MAC address associated with the processing target translation MC address is set as the destination MAC address respectively, and outputting the thus-generated video request to the IF-1 (step S503). Thereafter, the multicast management unit 23 terminates this second video request transfer process and the process in FIG. 10.

While on the other hand, if "MC" is set in the transfer type flag in the associated request management information (FIG. 10: step S205; MC), the multicast management unit 23 executes a process (unillustrated) of adding the IP address of the processing target video request source device to the source information in the associated request management information and a process (step S207) of discarding the processing target video request, and thereafter terminates the process in FIG. 10.

Given hereinafter are descriptions of an in-system function of the gateway device 10 in the network system according to the first embodiment and of a content of the information (a translation information group (the records of translation information)) that should be registered in the translation table 31 of the gateway device 10 by exemplifying the network system (employing four pieces of gateway devices 10A through 10D) having an architecture shown in FIG. 14.

Note that the respective components of the gateway device 10X (X A D) are termed such as a translation table 31X and a multicast management unit 23X in the following discussion. Further, an IP address of L3SW-X connected to the gateway device 10X is referred to as IP-L3SW-X, and an IP address and a MAC address of (IF-2) of the gateway device 10X are referred to as IP-X and MAC-X, respectively.

If the multicast-supported networks A D (FIG. 14) are categorized as a network group having a unified address scheme (this network group employs the multicast addresses over the self-networks, and these multicast addresses exist in only illustrated encoders ("ENC-A" etc.) but are not used in other networks), the translation tables 31A 31D are registered with pieces of information (the translation information group in which the accept MC addresses are coincident with the translation MC addresses) as exemplified in FIGS. 15A through 15D, respectively.

When this type of translation information group is registered in the translation tables 31A 31D, the network system (FIG. 14) starts functioning as a system enabling the decoder on each network X to receive any categories of video data distributed by the encoders A D.

For example, an assumption is that the decoder A ("DEC-A") issues for the first time a video request (IGMP) for the video data distributed by the encoder B ("ENC-B").

The multicast-supported network X, to which the gateway device 10X is connected, serves to support PIM-SM, and hence, in this case, it follows that a video request (PIM-JOIN) containing the setting of MC-B is sent from L3SW-A to the gateway device 10A.

The IF-1 of the gateway device 10A processes the received packet in the procedure explained with reference to FIG. 3. Therefore, the video request (which will hereinafter be termed a processing target video request) given from the L3SW-A is sent to a multicast management unit 23A.

The multicast management unit 23A receiving the processing target video request starts the UC video request transmission process (step S210: FIG. 11) for the reason that the processing target video request is given from the IF-1 (FIG. 10: step S201; NO), the associated translation information is stored in a translation table 31A (see FIG. 15A) (step S208; YES), and the associated request management information is not stored in a request management table 33A (step S209; NO).

Figure 16:
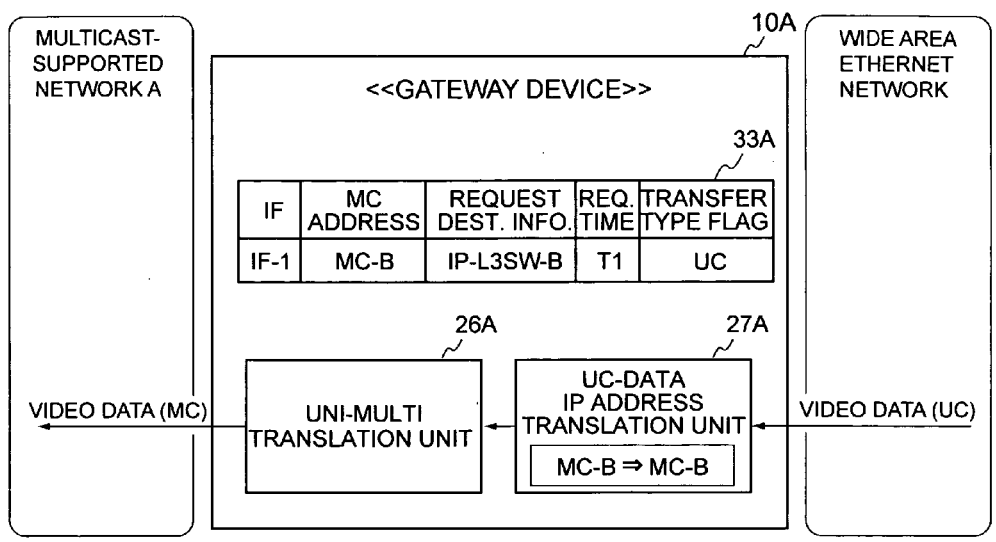
FIG. 16 is an explanatory diagram showing a status of the gateway device.

Then, the multicast management unit 23A starting the UC video request transmission process executes, normally (except a case that a MAC address management unit 22A can not acquire the MAC address of the gateway device 10B), a process (step S303) of registering the request management table 33A with the request management information having a content corresponding to the processing target video request, and a process (step S304) of registering a UC-data IP address translation unit 27A with the translation pattern information for translating the processing target translation MC address (the translation MC address in the associated translation information) into the processing target accept MC address (the accept MC address in the associated translation information) Accordingly, as schematically shown in FIG. 16, the request management table 33A in the gateway device 10A comes to a status of being stored with the request management information having the content corresponding to the processing target video request. Further, in this case, "MC-B" is entered in both of the processing target translation MC address and the processing target accept MC address (see FIG. 15(A)), and therefore the UC-data IP address translation unit 27A comes to a status of outputting the packet, in which "MC-B" is entered in the destination IP address, as it is (the value of the destination IP address remains unchanged) without discarding the packet.

Moreover, the multicast management unit 23A finishing the processes described above, generates the video request having a content corresponding to the processing target video request and in which the processing target translation MC address is set as the MC address, and the video request destination MAC address is set as the destination MAC address respectively, and outputs the thus-generated video request to the IF-2 (FIG. 11: step S305), whereby the video request containing the setting of "MC-B" is unicast over the wide area Ethernet network to the gateway device 10B.

A multicast management unit 23B receiving via the IF-2 this video request (which will hereinafter be referred to as a processing target video request), starts the first video request transfer process (step S204: FIG. 12) for the reason that the processing target video request is given from the IF-2 (FIG. 10: step S201;YES), the associated translation information is stored in a translation table 31B (step S202; YES), and the associated request management information is not stored in a request management table 33B (step S203; NO).

Then, the multicast management unit 23B starting the first video request transfer process executes a process (step S401) of registering the request management table 33B with the request management information having a content corresponding to the processing target video request, a process (step S402) of registering a MC-data IP address translation unit 24B with the translation pattern information for translating the processing target translation MC address "MC-B" into the processing target accept MC address "MC-B", and a process (step S403) of registering the multi-uni translation unit 25B with the translation pattern information for translating the destination MAC address of the video data packet in which the value in the destination IP address is coincident with the processing target translation MC address "MC-B", into the processing target video request source MAC address (the MAC address of the gateway device 10A in this case).

Figure 17:
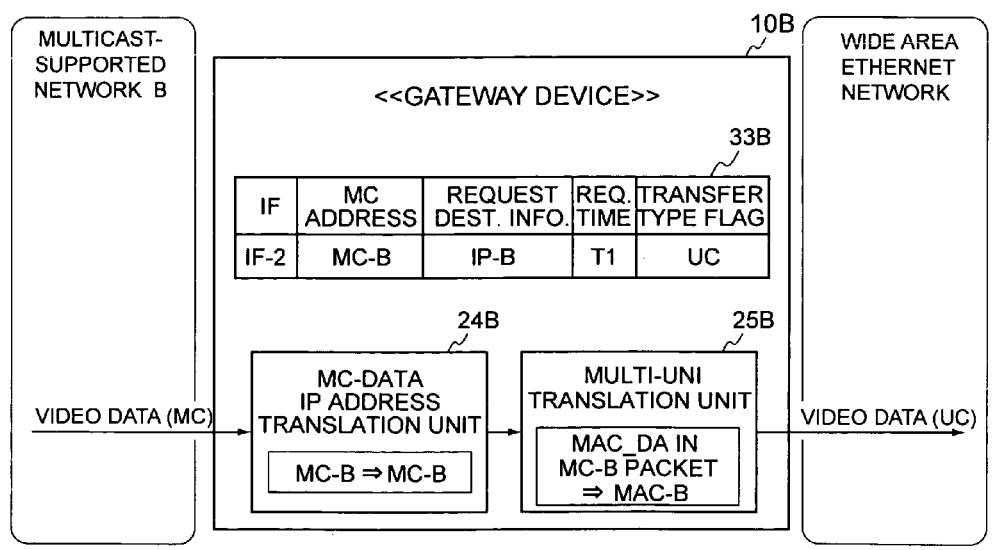
FIG. 17 is an explanatory diagram showing a status of the gateway device.

Accordingly, as schematically shown in FIG. 17, the request management table 31B in the gateway device 10B comes to a status of being stored with the request management information consisting of "MC-B", "UC", etc. Further, the MC-data IP address translation unit 24B becomes a status of outputting the video data packet as it is, in which "MC-B" is entered in the destination IP address. The multi-uni translation unit 25B comes to a status of translating the destination MAC address of the video data packet in which "MC-B" is entered in the destination IP address, into "MAC-A" (the MAC address of the gateway device 10A).

Moreover, the multicast management unit 23B executes also a process (step S404) of generating the video request having a content corresponding to the processing target video request and in which the processing target translation MC address is set as the MC address, and the multicast MAC address associated with the processing target translation MC address is set as the destination MAC address respectively, and outputting the thus-generated video request to the IF-1 (step S404).

The multicast-supported network B receiving this video request comes to a status of outputting each video packet (the destination IP address="MC-B") given from the encoder B toward the gateway device 10B.

As already explained, the MC-data IP address translation unit 24B (see FIG. 17) in the gateway device 10B starts the operation in the status of outputting the packet as it is, in which "MC-B" is entered in the destination IP address. Further, the multi-uni translation unit 25B starts the operation in the status of translating, into "MAC-A", the destination MAC address of the packet in which "MC-B" is entered in the destination IP address. Therefore, each of the video data packets from the multicast-supported network B is forwarded over the wide area Ethernet network to the gateway device 10A as a unicast packet in which "MC-B" is entered in the destination IP address.

Moreover, the UC-data IP address translation unit 27A (see FIG. 16) of the gateway device 10A starts the operation in the status of sending the packet as it is, in which "MC-B" is entered in the destination IP address, to the uni-multi translation unit 26A. Then, the uni-multi translation unit 26A translates the video data packet (in which the MAC address/ multicast MAC address of the IF-2 is set as the destination MAC address) coming from the UC-data IP address translation unit 27A, into a normally-formatted multicast packet (in which the multicast address is set as the destination address) . Therefore, it follows that the gateway device 10A including the UC-data IP address translation unit 27A becoming the status shown in FIG. 16, functions as a device translating each video data packet forwarded from the gateway device 10B and in which "MC-B" is entered in the destination IP address, and "MAC-A" is entered in the destination MAC address respectively, into the normal MC packet (to be received by the decoder A) , and outputting the translated packet over the multicast-supported network A.

Furthermore, when the gateway devices 10A and 10B function in the status described above, if the decoder C ("DEC-C") issues the video request (IGMP) for the video data distributed by the encoder B ("ENC-B") , the gateway devices 10A and 10C function as follows.

In this case, the video request (PIM-JOIN) containing the setting of "MC-B" is transmitted via the L3SW-C to the gateway device 10C.

In the gateway device 10C receiving this video request, the translation table 31C has the content shown in FIG. 15C while the request management table 33C has a free space (null) so that a multicast management unit 23C executes the video request transmission process (step S210: FIG. 11).

Figure 18:
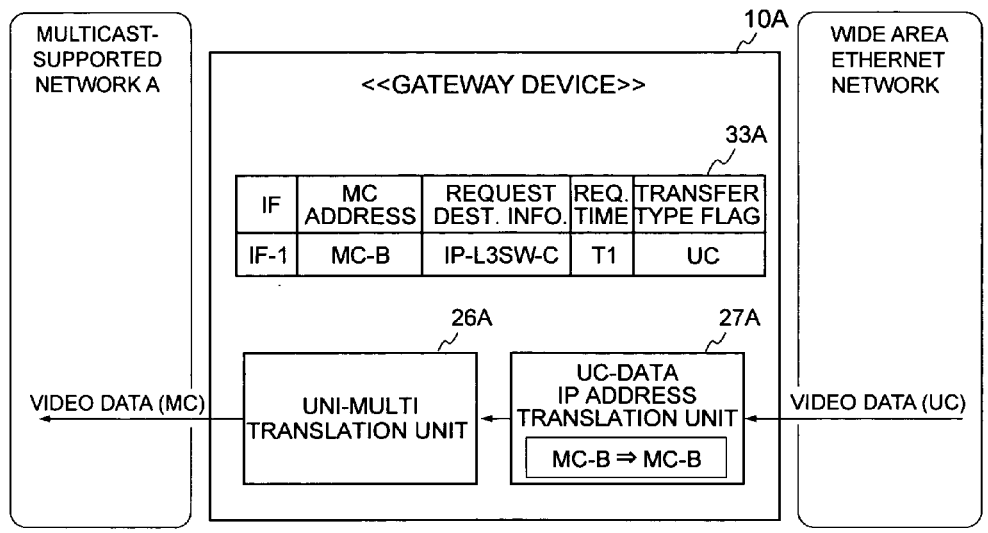
FIG. 18 is an explanatory diagram showing a status of the gateway device.

Accordingly, as schematically shown in FIG. 18, the UC-data IP address translation unit 27C in the gateway device 10C comes to a status of outputting the packet as it is, in which "MC-B" is entered in the destination IP address, without discarding this packet.

Moreover, the gateway device 10C unicasts the video request containing the setting of "MC-B" to the gateway device 10B (FIG. 11: step S305).

The multicast management unit 23B receiving this video request (which will herein after be referred to as the processing target video request) from the IF-2, judges which value, "UC" or "MC", is entered in the transfer type flag in the associated request management information for the reason that the processing target video request is given from the IF-2 (FIG. 10: step S201; YES), the associated translation information is stored in the translation table 31A (step S202; YES), and the associated request management information is stored in the request management table 33A (step S203; YES).

Figure 13:
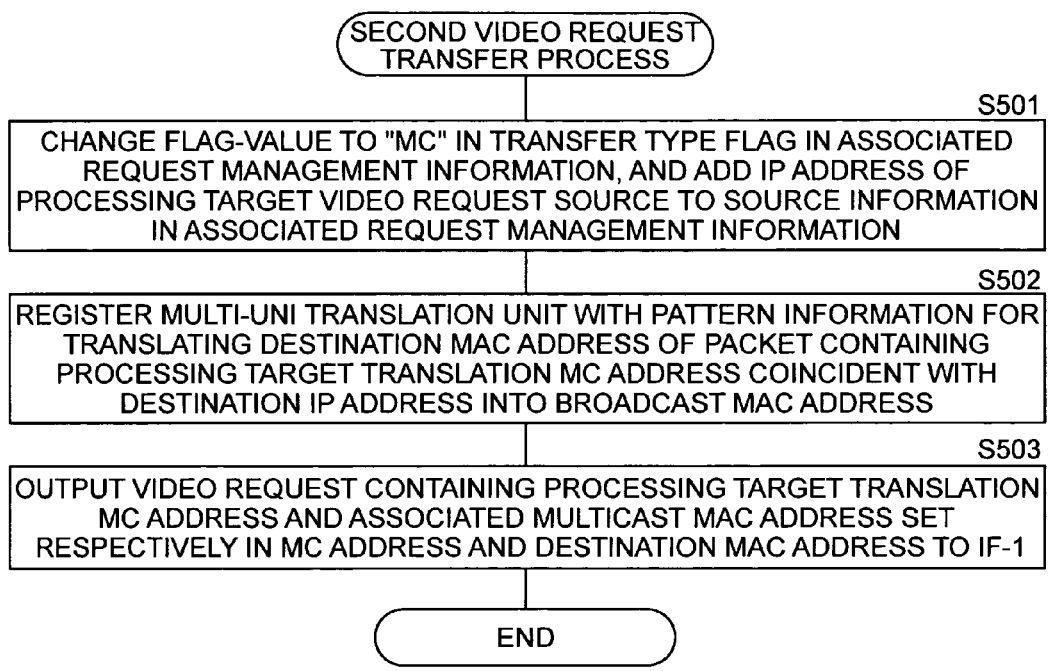
FIG. 13 is a flowchart showing a second video request transfer process executed by the multicast management unit.

Then, since "UC" is entered in the transfer type flag in the associated request management information (see FIG. 17), the multicast management unit 23B executes the second video request transfer process (step S206: FIG. 13).

Specifically, the multicast management unit 23B executes a process of changing, to "MC", a value in the transfer type flag in the associated request management information, and adding an IP address of the processing target video request source device to the source information in the associated request management information (step S501), a process of registering the multi-uni translation unit 25B with the translation pattern information for translating, into a broadcast MAC address, the destination MAC address of the packet in which the destination IP address is coincident with the processing target translation MC address "MC-B" (step S502) and a process of generating the video request having a content corresponding to the processing target video request and in which the processing target translation MC address is set as the MC address, and the multicast MAC address associated with the processing target translation MC address is set as the destination MAC address respectively, and outputting the thus-generated video request to the IF-1 (step S503).

Figure 19:
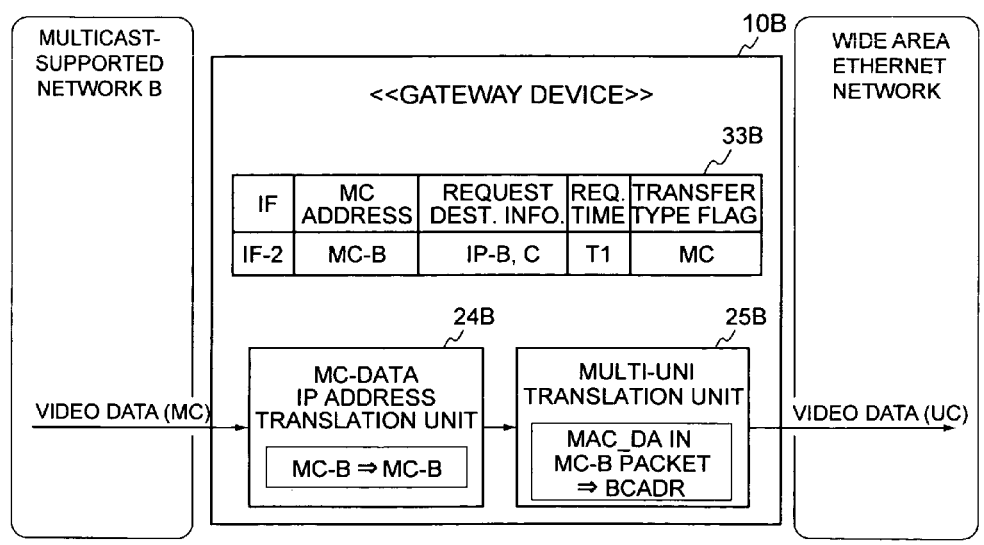
FIG. 19 is an explanatory diagram showing a status of the gateway device.

Accordingly, the gateway device 10B, as schematically shown in FIG. 19, comes to a status of translating into, the broadcast packet, the video data packet in which "MC-B" is entered in the destination IP address and forwarding this broadcast packet over the wide area Ethernet network from the multicast-supported network B.

Then, the gateway devices 10A and 10C respectively operate in the statuses shown in FIGS. 16 and 18. Moreover, the gateway device 10D operates in a status of discarding all the video data packet, and hence it follows that the video data packets broadcast over the wide area Ethernet network by the gateway device 10B are, after being translated into the normal multicast packets, forwarded over only the multicast-supported networks A and B.

Next, in the case of configuring the network system including the multicast-supported networks in which the address schemes are not yet unified, there will be explained a content of the information that should be registered in the translation table 31 of the gateway device 10 and a function of the gateway device 10 in this network system.

Figure 14:
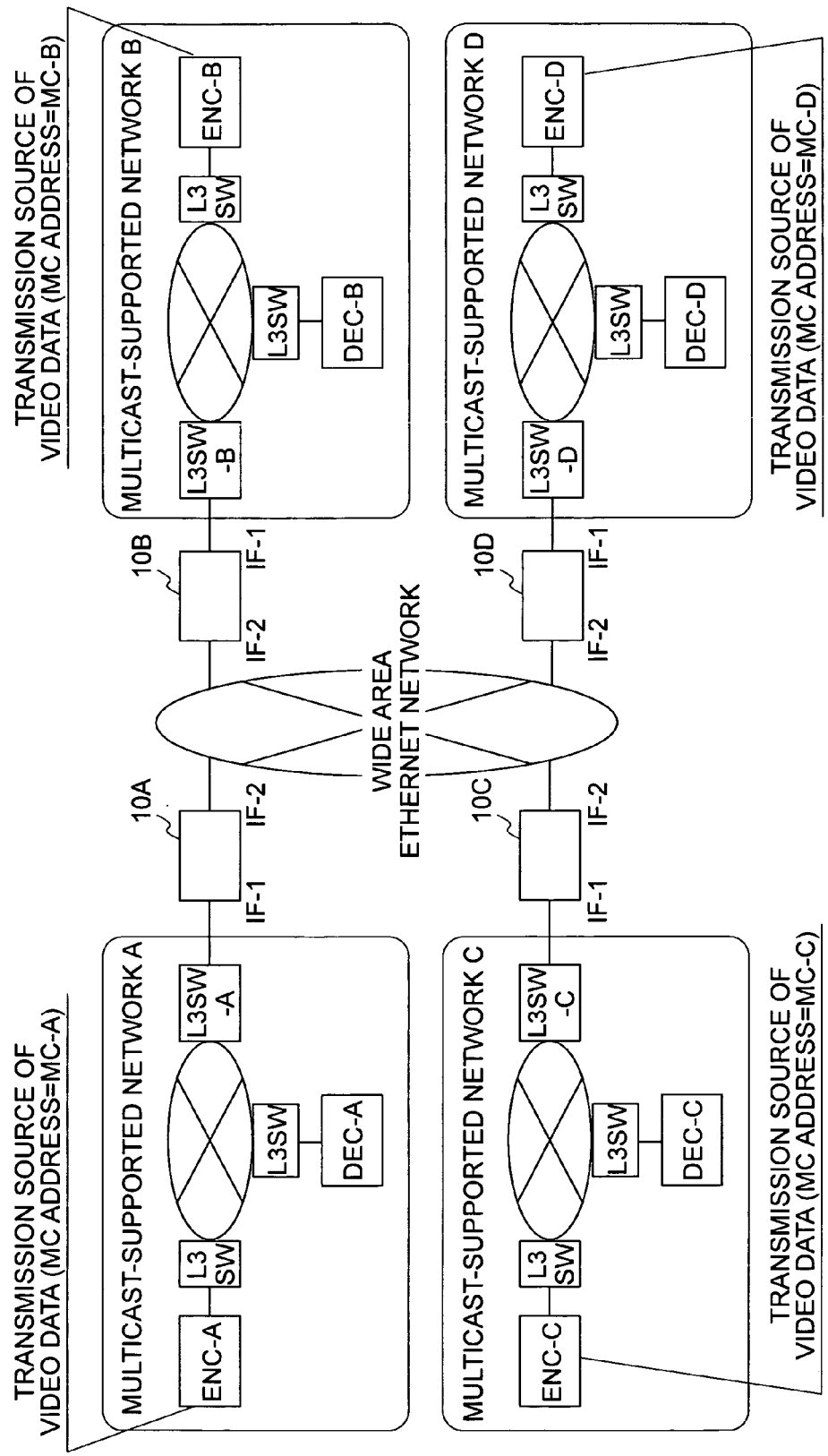
FIG. 14 is a view of configuration of a network system employed for explaining the operation of the gateway device according to the first embodiment.

If the encoders A and B in the network system shown in FIG. 14 are constructed to transmit the video data packets in which the same multicast address "MC-1" is set as the destination IP address, the translation tables 31A 31D are registered with records of information as exemplified in FIGS. 20A through 20D.

The network system, where such a translation information group is registered in each of the translation tables 31A 32D, functions as a system in which the decoder X in each network X can receive any categories of video data distributed by the encoders A D.

For example, an assumption is that the decoder A ("DEC-A") issues for the first time a video request (IGMP) for the video data distributed by the encoder B ("ENC-B").

In this case, it follows that the gateway device 19A unicasts the vide request containing the setting of "MC-B" to the gateway device (see FIGS. 20C, 10, 11, etc.).

Then, the multicast management unit 23B receiving this video request from the IF-2 executes, as the translation table 31B has a content shown in FIG. 20B, a process of registering the MC-data IP address translation unit 24B with the translation pattern information for translating "MC-1" into "MC-B" (FIG. 11: step S402). The multicast management unit 23B executes also a process of registering the multi-uni translation unit 25B with the translation pattern information for translating the destination MAC address of the video data packet in which the destination IP address is coincident with "MC-B", into the processing target video request source MAC address (the MAC address of the gateway device 10A in this case (step S403).

Figures 21, 22:
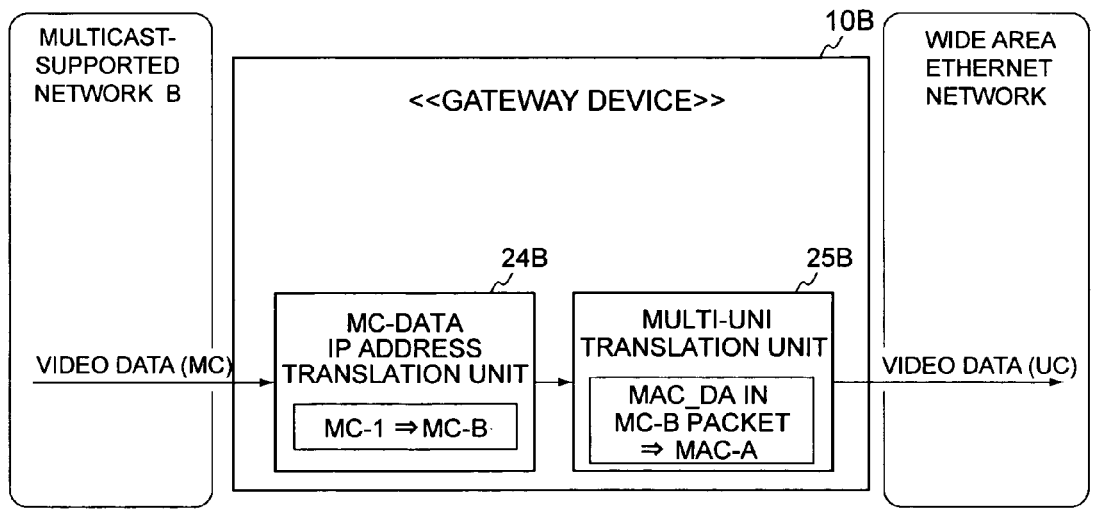
FIG. 21 is an explanatory diagram showing a status of the gateway device.
FIG. 22 is an explanatory diagram of the translation information registered in the translation table in the gateway device.
Figure 26:
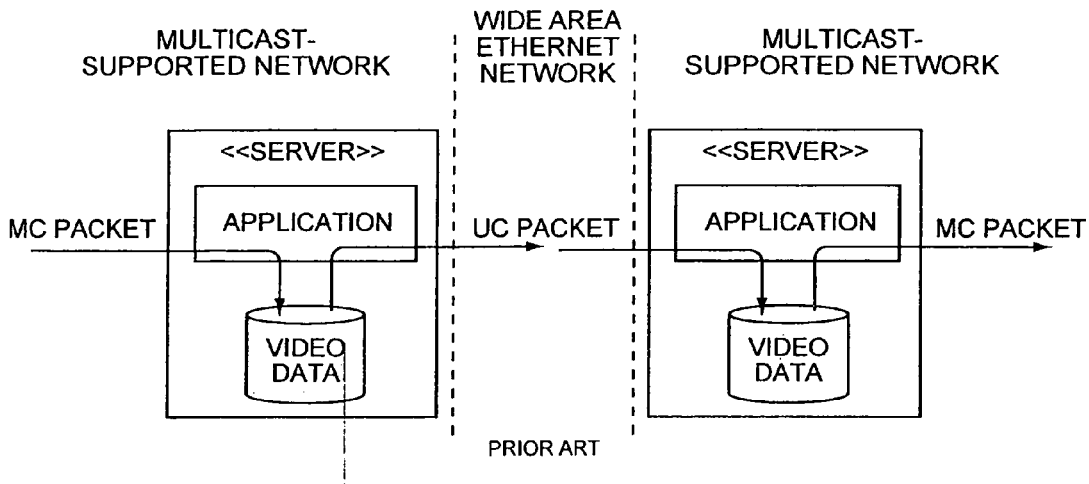
FIG. 26 is an explanatory diagram showing a multicast-supported network sharing method in the prior art.
Figure 27:
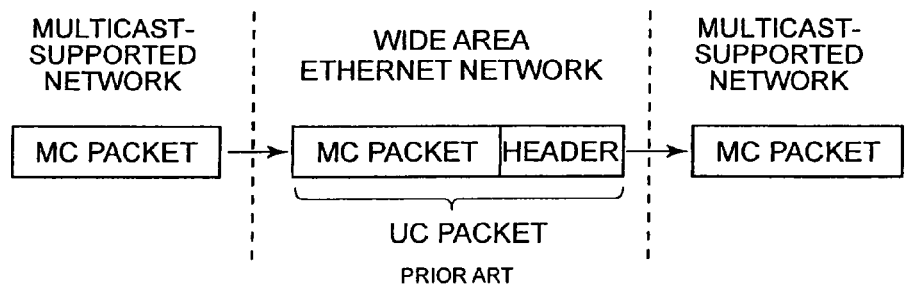
FIG. 27 is an explanatory diagram showing a multicast-supported network sharing method in the prior art.
Figure 28:
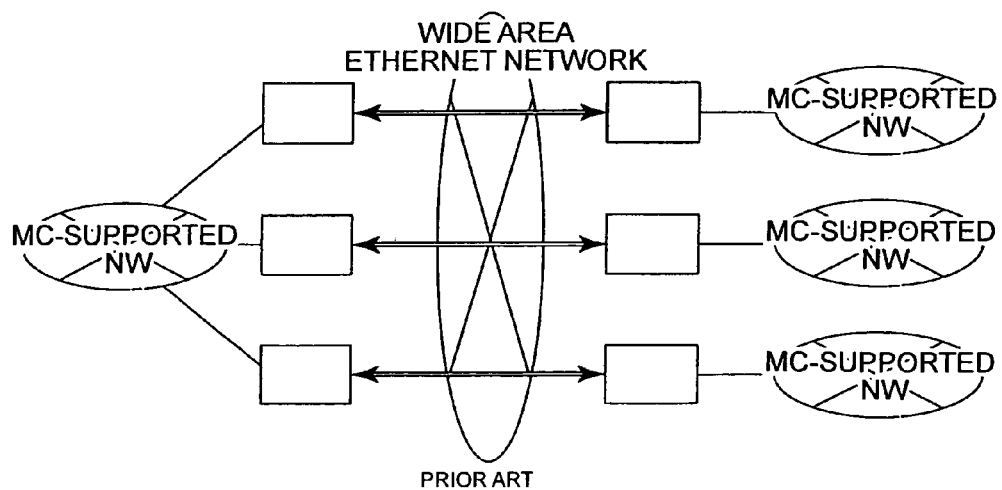
FIG. 28 is an explanatory diagram showing a multicast-supported network sharing method in the prior art.

Hence, as schematically shown in FIG. 21, the MC-data IP address translation unit 24B comes to a status of translating the destination IP address of the video data packet in which "MC-1" is entered in the destination IP address, into "MC-B". The multi-uni translation unit 25A comes to a status of translating the destination MAC address of the video data packet in which "MC-B" is entered in the destination IP address, into "MAC-A" (the MAC address of the gateway device 10A).

Further, the multicast management unit 23B finishing the process in step S403 becomes a status of generating the video request having a content corresponding to the processing target video request and in which the processing target translation MC address ("MC-1") is set as the MC address, and the multicast MAC address associated with the processing target translation MC address is set as the destination MAC address, and outputting the thus-generated video request to the IF-1 (step S404). Therefore, the multicast-supported network B comes to a status of forwarding each video data packet transmitted by the encoder B toward the gateway device 10B.

The (value entered in the) destination IP address of each video data packet transmitted by the encoder B is "MC-1", and the statuses of the MC-data IP address translation unit 24B and the multi-uni translation unit 25B in the gateway device 10B are those shown in FIG. 21. Accordingly, it follows that each video data packet is translated into a unicast packet, to the gateway device 10A, in which "MC-B" is entered in the destination IP address, and the thus-translated unicast packet is forwarded to the gateway device 10A.

Then, the gateway device 10A starts the operation in a status of forwarding, after translating each packet sent from the gateway device 10B into the normally-formatted multicast packet (the video data packet sent by the decoder B is the video data packet having different contents of an IP header and a MAC header), the thus-translated multicast packet over the multicast-supported network A. Moreover, the multicast packet (the video data packet) forwarded over the multicast-supported network A by the gateway device 10A is a packet in which the multicast address assigned by the decoder A is set as the destination IP address, and therefore, eventually, through the aforementioned operations of the gateway devices 10A and 10B, there occurs a status enabling the decoder B to receive the video data from the encoder A.

Further, if the multicast-supported network A in the network system shown in FIG. 14 is a network wherein "MC-B" can not be used as the multicast address for acquiring the video data from the encoder B, the information as shown in FIGS. 20A through 20D is registered in each of the translation tables 31B 31D. Then, the translation table 31A is registered with the information as shown in FIG. 22.

When the translation table 31A is registered with the information as shown in FIG. 22, in the case of receiving for the first time the video request containing the setting of "MC-B'" from the multicast-supported network A (FIG. 10: step S209; NO), the multicast management unit 23A executes a process of registering the UC-data IP address translation unit 27A with the translation pattern information for translating, into "MC-B'", the destination IP address "MC-B" set in the video data packet (FIG. 11: step S304), and a process of sending the video request with the multicast address translated into "MC-B" to the gateway device 10B (step S305).

The gateway device 10B (and the multicast-supported network B) receiving this video request starts forwarding the video data packet in which "MC-B" is entered in the destination IP address, and "MAC-A" (the MAC address of the gateway device 10A) is entered in the destination MAC address. Then, in the gateway device 10A, the UC-data IP address translation unit 27A starts the operation in the status shown in FIG. 23, and hence it follows that the video data packet given from the gateway device 10B is forwarded, over the multicast-supported network A, as the multicast packet (received by the encoder issuing the video request (IGMP) containing the setting of "MC-B") in which "MC-B'" is entered in the destination IP address.

As discussed in depth so far, the gateway devices 10 according to the first embodiment of the present invention are capable of, if M-pieces of gateway devices 10 are employed, actualizing the network system enabling the distribution target data (video data) to be transferred and received between the arbitrary two networks among M-pieces of multicast-supported networks. Then, the network system actualized by employing the gateway devices 10 is that each multicast data packet is forwarded as the unicast packet over the wide area Ethernet network (L2 network) when transferring and receiving the distribution target data. Moreover, the gateway device 10 performs the translation from the multicast packet into the unicast packet and the translation from the unicast packet into the multicast packet by the processing that is as extremely simple as changing the destination MAC address, and can be therefore manufactured at a low cost. Accordingly, the use of the gateway devices 10 enables the network system to be actualized (configured) at the low cost, this network system having the configuration that the plurality of multicast-supported networks are connected via the L2 networks, and enabling the high-speed data transfer between the multicast-supported networks.

Moreover, the gateway device 10 according to the first embodiment has a contrivance of shifting to the status of broadcasting the video data packet from the self-network at a stage that the gateway device 10 must forward the video data packets over the two networks. It is judged different depending on the system architecture which method is better, the broadcasting of the video data packets or the transmission of two pieces of unicast packets, in order to forward the video data packets over the two networks. Therefore, the gateway device 10 can be said to be the device that should be employed for configuring the network system taking the option of broadcasting the video data packets as the better method in such a case that the video data packets must be forwarded over the two networks.

Second Embodiment

The basic configuration of a gateway device according to a second embodiment of the present invention is the same as that of the gateway device 10 according to the first embodiment. Therefore, the following discussion employs the same numerals as those used for the description of the first embodiment, and will be focused on a different part of the configuration and a different part of the operation of the gateway device according to the second embodiment from those of the gateway device according to the first embodiment.

The gateway device 10 according to the second embodiment is, as shown in FIG. 24, provided with a transfer type change threshold value table having a content as shown in FIG. 24, i.e., the transfer type change threshold value table is stored with a transfer type change threshold value for every bit rate range.

Further, the multi-uni translation unit 25 provided in the gateway device 10 according to the second embodiment, if the self-unit is registered with plural records of translation information each containing the same IP address as the multicast address set in the video data packet inputted from the MC-data IP address translation unit 24, assembles the video data packet with respect to each of the plural records of translation information (this unit 25 assembles a plurality of video data packets having different MAC addresses, from the single video data packet).

Then, the multicast management unit 23 provided in the gateway device 10 according to the second embodiment has a function of grasping a bit rate of a corresponding piece of video data from stream category information contained in an application header of the video data packet transmitted from the self-network and having a structure as shown in FIG. 25, and executing a process of managing the grasped bit rate in a way that associates the bit rate with a multicast address.

Moreover, the multicast management unit 23 provided in the gateway device 10 according to the second embodiment executes, as the processes corresponding to steps S203 through S206 in FIG. 10, a process of judging whether the transfer type change threshold value in the transfer type change threshold value table (FIG. 24) that is associated with the bit rate managed in association with the processing target MC address, is equal to or smaller than the number of records of the associated translation information, a process of starting the first video request transfer process if the transfer type change threshold value is equal to or smaller than the number of records of associated translation information, and a process of starting the second video request transfer process if the transfer type change threshold value is coincident with the number of records of associated translation information. Note that the first video request transfer process executed by the multicast management unit 23 according to the second embodiment has the same content as the first video request transfer process executed by the multicast management unit 23 according to the first embodiment. Moreover, the second video request transfer process executed by the multicast management unit 23 according to the second embodiment is a such a process that the process of causing occurrence of the status that the multi-uni translation unit 25 is registered with only the translation pattern information containing the processing target MC address ad the broadcast MAC address as the translation pattern information containing the IP address coincident with the processing target MC address, is executed as a process corresponding to step S502.

In short, the gateway device 10 according to the second embodiment of the present invention is the modified version of the gateway device 10 according to the first embodiment so as to take the status of unicasting each video data packet related to a certain category of video data to one other gateway device 10, the status of unicasting each video data packet related to the concerned category of video data to the plurality of other gateway devices 10, and the status of broadcasting each video data packet related to the concerned category of video data over the wide area Ethernet network.

Accordingly, the use of the gateway devices 10 according to the second embodiment of the present invention makes it possible to actualize the network system having the architecture unsuited to the use of the gateway devices 10 according to the first embodiment.

<<Modified Modes>>

The gateway devices 10 according to the first embodiment and the second embodiment can be modified in a variety of forms. For instance, it is feasible to manufacture the gateway device for connecting the multicast-supported network including no existence of the transmitting source of the multicast packet to the wide area Ethernet network by removing the configuration for processing the video data packet sent from the self-network out of the gateway device 10 described above. It is also possible to manufacture the gateway device for connecting the multicast-supported network including no existence of the receiving source of the multicast packet to the wide area Ethernet network by removing the configuration for processing the video data packet sent from the wide area Ether net network out of the gateway device 10 described above.

Moreover, the gateway device 10 can be modified into a device that does not have the IP address translation function (wherein the IP address translation units 24, 27 function as filters). Still further, the gateway device 10 can be also modified into a device by which the video request is broadcast over the wide area Ethernet network.

What is claimed is:

1. A gateway device for connecting a multicast-supported network to a multicast-unsupported layer 2 (L2) network, comprising:

an interface to the multicast-supported network;

an interface to the L2 network;

translation pattern information storage means for storing plural records of translation pattern information each consisting of a multicast IP address and a MAC address;

first type data request packet processing means for assembling, when receiving a multicast request packet from the multicast-supported network as a first type data request packet for requesting distribution target data to be distributed from another multicast-supported network, a second type data request packet in which a destination MAC address of the first type data request packet is translated into a MAC address of a second gateway device, capable of transmitting, over the L2 network, multicast data packets in response to the first type data request packet, and transmitting the second type data request packet over the L2 network;

second type data request packet processing means for storing, when receiving a second type data request packet from the L2 network, in said translation pattern information storage means, a record of translation pattern information consisting of a multicast IP address set in the second type data request packet and a MAC address of a third gateway device transmitting the second type data request packet, and for assembling a packet in which a destination MAC address of the second data type request packet is translated into a multicast MAC address associated with the multicast IP address set in the second type data request packet, and transmitting the address-translated packet over the multicast-supported network;

data packet processing means for assembling, when receiving a multicast data packet as the multicast packet of distribution target data from the multicast-supported network and if a record of translation pattern information in said translation pattern information storage means contains an IP address coincident with a destination multicast IP address of the multicast data packet, a L2-network packet in which a destination multicast MAC address of the multicast data packet is translated into a MAC address corresponds to the multicast IP address contained in the record of translation pattern information, and transmitting the L2-network packet over the L2 network; and L2-network data packet processing means for assembling, when receiving an L2-network data packet from the L2 network, a packet in which a destination MAC address of the L2-network data packet is translated into a multicast MAC address associated with a multicast IP address set in the L2-network data packet, and transmitting the address-translated packet over the multicast-supported network.

2. A gateway device according to claim 1, wherein said data packet processing means is means for assembling, if said translation pattern information storage means is stored with plural records of translation pattern information each containing an IP address coincident with the destination IP address of the multicast data packet, the L2-network packet with respect to every record of translation pattern information, and transmitting the L2-network packet over the L2 network.

3. A gateway device according to claim 1, wherein said second type data request packet processing means changes, under such a condition that said translation pattern information storage means is stored with the translation pattern information containing the same IP address as the multicast IP address set in the second type data request packet and also containing a MAC address different from the MAC address of said gateway device transmitting the second type data request packet, the MAC address set in the translation pattern information into a broadcast MAC address.

4. A gateway device according to claim 1, wherein said second type data request packet processing means stores, under such a condition that said translation pattern information storage means is stored with a predetermined number of records of translation pattern information each containing the same IP address as the multicast IP address set in the second type data request packet transmitted from the side of the L2 network, said translation pattern information storage means with translation pattern information consisting of a multicast IP address set in the second type data request packet and a broadcast MAC address, associated with the multicast IP address as a substitute for the predetermined number of records of translation pattern information.

5. A gateway device according to claim 4, further comprising transfer type change threshold value storage means stored with a plurality of transfer type change threshold values in a way that enables one transfer type change threshold value to be specified from a bit rate, wherein said second type data request packet processing means is means having a function of grasping a bit rate of an arbitrary multicast data packet transmitted from the side of the multicast-supported network, and managing the bit rate in a way that associates the bit rate with the multicast IP address set in the multicast data packet, and is also means for storing said translation pattern information storage means with the translation pattern information consisting of the multicast IP address set in the second type data request packet and the broadcast MAC address in place of a translation pattern information group containing the same IP address as the multicast IP address under such a condition that the number of records of translation pattern information each containing the same IP address as the multicast IP address set in the second type data request packet transmitted from the side of the L2 network, is coincident with the transfer type change threshold value stored on said transfer type change threshold value storage means that is specified by the bit rate managed in association with the multicast IP address.

6. A gateway device according to claim 1, wherein each of said first type data request packet processing means and said L2-network packet processing means has a function of translating the destination IP address.

7. A gateway device according to claim 1, wherein each of said second type data request packet processing means and said data packet processing means has the function of translating the destination IP address.

* * * * *

UNITED STATES PATENT AND TRADEMARK OFFICE
CERTIFICATE OF CORRECTION

PATENT NO. : 7,616,634 B2  Page 1 of 1
APPLICATION NO. : 11/181776
DATED : November 10, 2009
INVENTOR(S) : Gotoh et al.

It is certified that error appears in the above-identified patent and that said Letters Patent is hereby corrected as shown below:

Title Page, Column 2 (Abstract), Line 7, change "witch is capble" to
--which is capable--.

Signed and Sealed this

Second Day of February, 2010

David J. Kappos
*Director of the United States Patent and Trademark Office*